US 8,810,813 B2

(12) United States Patent
Hayakawa

(10) Patent No.: US 8,810,813 B2
(45) Date of Patent: Aug. 19, 2014

(54) PRINT DOCUMENT PROCESSING SYSTEM, CACHE APPARATUS, COMPUTER READABLE MEDIUM STORING PROGRAM, AND PRINT DOCUMENT PROCESSING METHOD

(75) Inventor: Michio Hayakawa, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 655 days.

(21) Appl. No.: 13/110,590

(22) Filed: May 18, 2011

(65) Prior Publication Data
US 2012/0133964 A1 May 31, 2012

(30) Foreign Application Priority Data

Nov. 30, 2010 (JP) ................................ 2010-267562

(51) Int. Cl.
G06F 3/12 (2006.01)
G06K 15/00 (2006.01)

(52) U.S. Cl.
CPC ............ *G06F 3/1288* (2013.01); *G06F 3/1247* (2013.01); *G06F 3/1245* (2013.01); *G06F 2212/464* (2013.01); *G06F 3/1211* (2013.01)
USPC .......................................... 358/1.13; 358/1.16

(58) Field of Classification Search
None
See application file for complete search history.

(56) References Cited

U.S. PATENT DOCUMENTS

| 6,101,576 A * | 8/2000 | Kobayashi et al. ........... 711/122 |
| 2004/0168028 A1 | 8/2004 | Cierniak |
| 2007/0240139 A1* | 10/2007 | Osada ........................... 717/146 |
| 2008/0137135 A1* | 6/2008 | Takeishi ....................... 358/1.15 |
| 2008/0143732 A1* | 6/2008 | Shiozaki ....................... 345/543 |
| 2009/0147288 A1* | 6/2009 | Matsuda ........................ 358/1.9 |
| 2011/0013209 A1* | 1/2011 | Yamazaki ..................... 358/1.9 |
| 2011/0267645 A1* | 11/2011 | Miyazaki ..................... 358/1.15 |
| 2012/0206759 A1* | 8/2012 | Elliott et al. ................. 358/1.15 |

FOREIGN PATENT DOCUMENTS

| EP | 1 698 976 A1 | 9/2006 |
| JP | A-2000-335022 | 12/2000 |

OTHER PUBLICATIONS

Coloma et al., "DAChe: Direct Access Cache System for Parallel I/O", *Proceedings of the 2005 International Supercomputer Conference*, 2005.
Office Action issued in Australian Patent Application No. 2011202615 dated Sep. 27, 2012.
Office Action issued in Australian Application No. 2011202615 issued Nov. 4, 2013.

* cited by examiner

*Primary Examiner* — Marcus T Riley
(74) *Attorney, Agent, or Firm* — Oliff PLC

(57) ABSTRACT

A print document processing system includes a cache apparatus and plural data processing apparatuses. Each data processing apparatus includes an image data creating unit and a reservation request transmission unit. The cache apparatus includes a cache memory, a memory, and an area reservation unit. The image data creating unit creates image data for each document element of print document data. The memory stores use condition information and cache priority of the document element for each document element. Upon receipt of a reservation request for reserving a storage area for image data of a first document element from a data processing apparatus, the area reservation unit reserves the storage area by selecting a second document element, which has a lower cache priority than the first document element and which is currently being used by any of the data processing apparatuses, as a document element to be evicted from the cache memory.

11 Claims, 26 Drawing Sheets

FIG. 2

| ID | STAGE | RIP CURRENTLY CREATING DATA | CUMULATIVE NUMBER OF QUERIES | USE COUNTER | ADDRESS OF CACHE AREA | SIZE OF CACHE DATA | SCORE | OBJECT ATTRIBUTE |
|---|---|---|---|---|---|---|---|---|
| 1 | 3 (CACHED) | — | 30 | 3 | ...... | 250 | 90 | ...... |
| 2 | 4 (CACHED OUT) | — | 5 | 0 | — | 100 | 25 | ...... |
| 3 | 3 (CACHED) | — | 25 | 4 | ...... | 200 | 85 | ...... |
| ... | ... | ... | ... | ... | ... | ... | ... | ... |
| 18 | 3 (CACHED) | — | 8 | 0 | ...... | 150 | 55 | ...... |
| 19 | 2 (CACHING) | — | 10 | 0 | — | 120 | 45 | ...... |
| 20 | 5 (NEVER CACHE) | — | 1 | — | — | — | 1 | ...... |
| ... | ... | ... | ... | ... | ... | ... | ... | ... |
| 33 | 4 (CACHED OUT) | — | 7 | 1 | ...... | 100 | 25 | ...... |
| 34 | 1 (NEW CACHE) | RIP#1 | 1 | 0 | ...... | 300 | 60 | ...... |
| 35 | 2 (CACHING) | — | 2 | 0 | ...... | 140 | 43 | ...... |
| 36 | 1 (NEW CACHE) | RIP#3 | 1 | 0 | ...... | 180 | 50 | ...... |
| ... | ... | ... | ... | ... | ... | ... | ... | ... |

FIG. 20

| ID | STAGE | RIP CURRENTLY CREATING DATA | RIP CURRENTLY USING ENTRY | CUMULATIVE NUMBER OF QUERIES | USE COUNTER | ADDRESS OF CACHE AREA | SIZE OF CACHE DATA | SCORE | OBJECT ATTRIBUTE |
|---|---|---|---|---|---|---|---|---|---|
| 1 | 3 (CACHED) | — | RIP#1, … | 30 | 3 | ..... | 250 | 90 | ...... |
| 2 | 4 (CACHED OUT) | — | ..... | 5 | 0 | — | 100 | 25 | ...... |
| 3 | 3 (CACHED) | — | RIP#3, … | 25 | 4 | ..... | 200 | 85 | ...... |
| ... | ... | ... | ... | ... | ... | ... | ... | ... | ... |
| 18 | 3 (CACHED) | — | — | 8 | 0 | ..... | 150 | 55 | ...... |
| 19 | 2 (CACHING) | — | — | 10 | 0 | — | 120 | 45 | ...... |
| 20 | 5 (NEVER CACHE) | — | — | 1 | — | — | — | 1 | ...... |
| ... | ... | ... | ... | ... | ... | ... | ... | ... | ... |
| 33 | 4 (CACHED OUT) | — | — | 7 | 1 | ..... | 100 | 25 | ...... |
| 34 | 1 (NEW CACHE) | RIP#1 | — | 1 | 0 | ..... | 300 | 60 | ...... |
| 35 | 2 (CACHING) | — | — | 2 | 0 | ..... | 140 | 43 | ...... |
| 36 | 1 (NEW CACHE) | RIP#3 | — | 1 | 0 | — | 180 | 50 | ...... |
| ... | ... | ... | ... | ... | ... | ... | ... | ... | ... |

PRINT DOCUMENT PROCESSING SYSTEM, CACHE APPARATUS, COMPUTER READABLE MEDIUM STORING PROGRAM, AND PRINT DOCUMENT PROCESSING METHOD

CROSS-REFERENCE TO RELATED APPLICATIONS

This application is based on and claims priority under 35 USC 119 from Japanese Patent Application No. 2010-267562 filed Nov. 30, 2010.

BACKGROUND (i) Technical Field

The present invention relates to a print document processing system, a cache apparatus, a computer readable medium storing a program, and a print document processing method.

SUMMARY

According to an aspect of the invention, there is provided a print document processing system including a cache apparatus and plural data processing apparatuses. Each of the plural data processing apparatuses includes an image data creating unit and a reservation request transmission unit. The image data creating unit creates bitmap image data or intermediate language image data by processing page description language data of each document element of print document data. The reservation request transmission unit transmits a reservation request for reserving a storage area for the image data created by the image data creating unit to the cache apparatus. The cache apparatus includes a cache memory, a memory, and an area reservation unit. The cache memory stores bitmap image data or intermediate language image data created by each of the data processing apparatuses. The memory stores, for each document element whose image data is stored in the cache memory, use condition information and cache priority of the document element. The use condition information is information indicating whether or not the image data of the document element is currently being used by any of the data processing apparatuses. Upon receipt of a reservation request for reserving a storage area for image data of a first document element from a data processing apparatus among the data processing apparatuses, the area reservation unit reserves the storage area by selecting a second document element as a document element to be evicted from the cache memory. The second document element has a lower cache priority than the first document element and is currently being used by any of the data processing apparatuses.

BRIEF DESCRIPTION OF THE DRAWINGS

Exemplary embodiment(s) of the present invention will be described in detail based on the following figures, wherein:

FIG. 2 illustrates an example of data contents of an entry management table;

FIG. 20 is a flowchart illustrating an example of data contents of an entry management table used in a second method according to the exemplary embodiment;

DETAILED DESCRIPTION

Exemplary embodiments of the present invention (hereinafter referred to as "exemplary embodiments") will be described with reference to the drawings. Throughout the drawings, similar components or steps are assigned the same numerals.

First Exemplary Embodiment

Configuration of Apparatuses

An example configuration of a print document conversion system that may be used in a configuration and process for area reservation according to a first exemplary embodiment and an example configuration of a printing system to which the print document conversion system is connected will be described with reference to FIG. 1.

Figure 1:
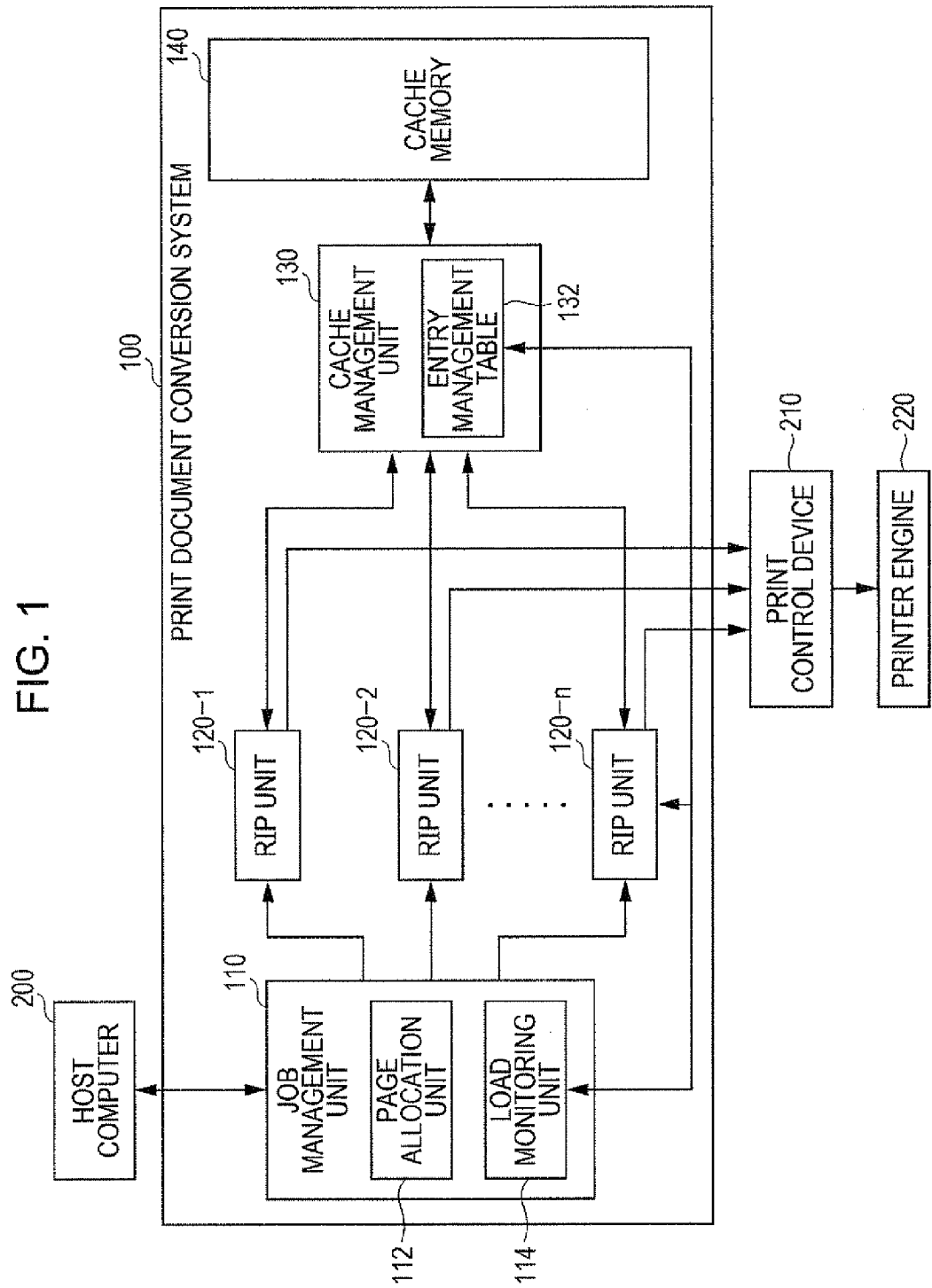
FIG. 1 illustrates an example configuration of a print document conversion system according to a first exemplary embodiment and also illustrates an example configuration of a printing system to which the print document conversion system is connected.

The printing system illustrated in FIG. 1 includes a print document conversion system 100, a host computer 200, a print control device 210, and a printer engine 220.

The print document conversion system 100 may be an apparatus that converts print document data written in a page description language (PDL) into print image data supported by the printer engine 220, such as bitmap (also called raster) image data. Although not illustrated in FIG. 1, the host computer 200 is connected to the print document conversion system 100 via a network such as a local area network (LAN). The host computer 200 sends the print document data to the print document conversion system 100 via the network, and instructs the print document conversion system 100 to print the print document data. While one host computer 200 is illustrated in FIG. 1, multiple host computers 200 may reside in a network.

The print document conversion system 100 includes a job management unit 110, n RIP (raster image processor) units 120-1, 120-2, ..., and 120-n, where n is an integer more than one, a cache management unit 130, and a cache memory 140.

The RIP units 120-1, 120-2, ..., and 120-n (hereinafter collectively referred to as "RIP units 120" unless otherwise identified individually) may be data processing apparatuses that perform RIP processing. As used herein, the term "RIP processing" means conversion processing for converting PDL print document data into print image data supported by the printer engine 220, such as bitmap (raster) image data. In the print document conversion system 100, plural RIP units 120 (n RIP units 120) perform RIP processing in parallel on a page-by-page basis, or perform RIP processing for up to n pages in parallel. The RIP processing is also called drawing or rendering. Each of the RIP units 120 checks given PDL data in sequence, starting from, for example, the beginning, interprets PDL data of an individual object (i.e., document element) found in sequence during the checking process, and generates intermediate language or bitmap image data. Here, several kinds of objects may be used, for example, text (character strings), figures (graphics), and images (continuous tone images). Each object may be represented by, for example, a PDL drawing command.

By way of example, the RIP units 120 may be configured to convert PDL data directly into print image data such as bitmap image data. Alternatively, the RIP units 120 may be configured to perform two-stage conversion, that is, converting PDL data into intermediate language data having a lower granularity than PDL commands, such as a display list, and converting the intermediate language data which is stored in a buffer into bitmap data.

The job management unit 110 receives print document data from the host computer 200, and manages the process of printing the print document data. Each piece of print document data received from the host computer 200 is hereinafter referred to as a "job". Jobs (print document data) received from the host computer 200 may include the so-called Variable Print jobs for combining data suitable for individual targets (for example, customers) which are stored in a database with master data and printing a copy for each target.

The management of the printing process which is performed by the job management unit 110 may include general job-based management of the printing order and page allocation management in which pages in one job are allocated to the individual RIP units 120. The latter page allocation management is performed by a page allocation unit 112.

For example, when print document data (job) is in the page-independent format (that is, the print document data format in which information necessary for the drawing of one page is completely written in PDL data of the page), the page allocation unit 112 may sequentially supply PDL data of different pages to the individual RIP units 120, and may cause RIP processing to be performed on the pages. Alternatively, the job management unit 110 may provide all the RIP units 120 with the entire print document data, and the page allocation unit 112 may sequentially notify each of the RIP units 120 of a page number that the RIP unit 120 is to process in the print document data (this method may be used for either page-independent jobs or page-dependent jobs).

The method for allocating a page to each of the RIP units 120 is not particularly limited. For example, the page allocation unit 112 may repeatedly perform the operation of allocating pages to the RIP units 120 in sequence in accordance with a predetermined order, in such a manner that page 1, page 2, ..., and page n are allocated to the RIP units 120-1, 120-2, ..., and 120-n, respectively. In another example, pages may be initially allocated in sequence to the RIP units 120, and then pages may be allocated in the order of the RIP units 120 that have completed the RIP processing of the allocated pages.

In still another example, the load of the RIP processing for each page may be estimated in advance (before the RIP processing is started), and the allocation of pages to the individual RIP units 120 may be scheduled in accordance with the estimated loads. The load of the RIP processing for each page may be determined by, for example, determining the load of the RIP processing for each object included in the page and summing the loads for all the objects. The load of the RIP processing for each object may be determined based on, for example, the complexity, the size (area), or the like of the object. The complexity of each object may be determined in accordance with the type of the object (such as image, font, and graphics) or the like. In general, the larger the number of objects is, the higher the load processing is. The load of the processing for image objects is generally higher than that of graphic objects. Further, generally, the larger the size is, the higher the load of the processing is. There are various techniques of the related art for estimating the load of the processing for each page based on such various parameters, and any of them may be used in the first exemplary embodiment.

The allocation of pages may also be scheduled by taking into account at least one of parameters including the current load on each of the RIP units 120, the degree of progress of the RIP processing of each page, the processing performance (such as central processing unit (CPU) speed), the load of the RIP processing for a page undergoing RIP processing by each of the RIP units 120, and the load of the RIP processing for a page to be allocated. In scheduling, for example, an RIP unit 120 that will most quickly complete the RIP processing of the page to be allocated is specified from among the RIP units 120 by comprehensively considering some or all the above illustrative parameters, and the page is allocated to the specified RIP unit 120. In the illustrated example, the page allocation unit 112 determines the load of the RIP processing for a remaining page that has not been processed, based on, for example, the load of the RIP processing for a page undergoing RIP processing by each of the RIP units 120 and based on the degree of progress of the processing. Then, the load of the RIP processing for the page to be allocated is added to the load of the RIP processing for the remaining page, and the result is divided by the processing performance (or the net processing performance obtained as a result of subtracting the current load from the processing performance) to obtain an index value indicating the time required from the current time to the time when an amount of processing corresponding to the sum of the load of the RIP processing for the remaining page and the load of the RIP processing for the page to be allocated is completed. Then, the index value is determined for each of the RIP units 120, and the resulting index values are compared to specify an RIP unit 120 that will most quickly complete the RIP processing for the page to be allocated.

The processing performance of each of the RIP units 120 among the above parameters for evaluation may be registered in advance in the job management unit 110 by the system administrator or the like. Further, the load of the RIP processing for a page undergoing RIP processing by each of the RIP units 120 and the load of the RIP processing for a page to be allocated may be determined in the manner as described above. The current loads on the individual RIP units 120 and the degree of progress of the RIP processing are monitored by a load monitoring unit 114 described below.

The load monitoring unit 114 may be a functional module that monitors the state of the load placed on each of the RIP units 120. For example, the load monitoring unit 114 periodically receives information regarding the current loads on the RIP units 120 from the individual RIP units 120. Examples of the information regarding the load on each of the RIP units 120 include the CPU utilization in a computer that is currently executing the program of the RIP unit 120, the number of active processes currently being executed by the CPU, and information as to whether the virtual memory in the computer is being used or not (for example, whether memory swapping occurs or not). The current load on the RIP units 120 may be represented by CPU utilization, or a load evaluation value may be determined comprehensively based on CPU utilization and other parameters such as the number of active processes and the use state of the virtual memory.

The load monitoring unit 114 may also obtain information regarding the degree of progress of the RIP processing on each page to be allocated (for example, up to what percentage of the page the RIP processing has been completed) from each of the RIP units 120, for example, periodically or each time a certain amount of RIP processing is performed. Furthermore, the current net processing performance of each of the RIP units 120 may be estimated based on the rate of change of the degree of progress over time which is obtained periodically from the RIP unit 120 or the rate of change of the degree of progress over time which is determined based on the time interval during which the certain amount of RIP processing is performed, and based on the data size of the page undergoing RIP processing by the RIP unit 120. Then, an index value indicating the time required from the current time to the time when an amount of processing corresponding to the sum of the data size of remaining pages and the data size of the page to be allocated is completed may be calculated using the estimated value.

The information regarding the load on each of the RIP units 120 which is determined by the load monitoring unit 114 may be used as a criterion that the determination of the page allocation unit 112 described above is based on, and may also be used for cache management. That is, for example, when one of the RIP units 120 performs RIP processing on an object, if another RIP unit 120 has started to perform RIP processing on the object, whether the former RIP unit 120 is to use the processing result (cache data) after the latter RIP unit 120 has completed the processing may be determined using the information regarding the load on each of the RIP units 120 (the details of the determination will be described below).

When performing RIP processing on PDL data of a page allocated by the page allocation unit 112, each of the RIP units 120 uses the cache memory 140 to reuse the previous RIP processing result (that is, the pages preceding the allocated page). That is, when each of the RIP units 120 performs RIP processing on PDL data of an object included in the allocated page, if the RIP processing result of the object has been stored in the cache memory 140, the RIP unit 120 reuses the RIP processing result stored in the cache memory 140 without performing RIP processing, and adds the image of the object to the print image data of the page. The term "object" is an aggregation of units of drawing, and may be represented by, for example, a single PDL drawing command. By contrast, if the RIP processing result of the object is not stored in the cache memory 140, the RIP unit 120 performs RIP processing on the PDL data of the object to add the image of the object to the print image data of the page. The generated RIP processing result of the object is registered (or cached) in the cache memory 140 for later reuse.

The RIP processing result (cache data) cached in the cache memory 140 may be either in the bitmap format or in the intermediate language format. If the cache data read from the cache memory 140 is in the bitmap format, each of the RIP units 20 may merely add (or combine) the cache data to (or with) the print image data of the page. If the cache data read from the cache memory 140 is in the intermediate language format, each of the RIP units 120 may further perform RIP processing on the cache data to generate a bitmap image, and may add (or combine) the generated bitmap image to (or with) the print image data of the page.

The operation of each of the RIP units 120 for reading from and writing to the cache memory 140 (for reading a cached RIP processing result and registering a RIP processing result in the cache memory 140) is managed by the cache management unit 130. The cache management unit 130 includes an entry management table 132, and controls the use of a cache by each of the RIP units 120 on the basis of the entry management table 132.

FIG. 2 illustrates an example of data contents of the entry management table 132. In the example illustrated in FIG. 2, each row, except for the heading row at the top, represents a management record for one cache entry. A cache entry is provided for each object in print document data. The management record of each individual cache entry contains items such as the ID, the stage, the RIP currently creating data, the cumulative number of queries, the use counter, the address of the cache area, the size of the cache data, the score, and the object attribute.

The "ID" is unique identification information for identifying a cache entry. Some PDLs may be used to assign an ID to an object that is possibly reused many times in a job, such as an image (bitmap), a font, and a form (master image) and to describe the ID of each object in print document data. For instance, Portable Document Format (PDF) is an example of such PDLs. Print document data written in such a PDL may be processed using the ID of an object in the print document data as the ID of a cache entry. Alternatively, the cache management unit 130 may identify each object and assign an ID to the object. In this case, each object may be identified based on, for example, the combination of a PDL drawing command and a parameter attached to the command. For example, a method may be used in which it is determined that objects having the same combination of a drawing command and a parameter attached to the command are identical.

The "stage" is information representing the current state of a cache entry (in other words, the cached state obtained as a result of RIP processing on an object). Stage is also called status. In the first exemplary embodiment, the following five stages are used: "New Cache", "Caching", "Cached", "Cached Out", and "Never Cache". These stages will be described in detail below.

The "RIP currently creating data" is an item for a cache entry at the "New Cache" ("currently being created") stage, and represents identification information regarding an RIP unit 120 that is currently creating the entry. This item may be used as a criterion against which, when a first RIP unit 120 is to perform RIP processing on a certain object, if a second RIP unit 120 is currently creating the cache data of the object, it is determined whether or not the first RIP unit 120 is to wait for the second RIP unit 120 to complete the creation of the cache data (a specific example of which will be described below). In some examples, the "RIP currently creating data" information may not necessarily be used for this determination, and in this case, the "RIP currently creating data" item is not necessary. The identification information regarding the RIP unit 120, which is registered in this item, is reset by the cache management unit 130 to a value indicating no RIP currently creating the cache data when the failure of reservation is returned in response to an area reservation request for caching (described below) from the RIP unit 120 or when a cache data registration request (described below) is received from the RIP unit 120.

The "cumulative number of queries" is the value indicating the cumulative number of queries about the cache entry that have been received from the RIP units 120 until the current time since the start of RIP processing from the beginning of the top page of the print document data.

The "use counter" indicates the number of RIP units 120 that is currently using the cache data of the cache entry. As used here, the term "use" of cache data of an object by a RIP unit 120 means the reading and using of the cache data of the object by the RIP unit 120 in order to combine a bitmap image of the object with the print image data of a page currently being created.

The "cache area address" represents the address (for example, start address) in the cache memory 140 at which cache data (that is, bitmap or intermediate language data obtained as a result of the RIP processing) of a cache entry is stored. It is to be understood that an address assigned to a cache entry for which cache data obtained as a result of the RIP processing is stored in the cache memory 140 (that is, a cache entry at the "Cached" stage described below) is registered in this item. An address may be assigned to a cache entry of an object that has been determined to be cached and whose cache data has not been created (that is, a cache entry at the "New Cache" stage described below), and may be registered in this item. Conversely, the value of a cache entry of an object whose RIP processing result is determined not to be worth caching (that is, an object at the "Never Cache" stage described below) or the value of a cache entry whose cache data has been evicted (i.e., deleted) from the cache memory 140 (a cache entry at the "Cached Out" stage described below) is set to blank in this item.

The "size of cache data" is information representing data size of the cache data of a cache entry, and may be represented in units such as bytes, kilobytes, or megabytes. If the cache data is in the bitmap format, the data size may correspond to the area of the image represented by the cache data. In many PDLs (for example, PDF), the image size of an object such as an image, a form, or a font is defined as an argument of a drawing command. In the case of such PDLs, for example, each of the RIP units 120 may determine information regarding an image size from the PDL description concerning the object, determine the data size of the cache data from the image size, and register the data size in the entry management table 132.

The "score" is an evaluation value indicating the priority of a cache entry. Because of the limited capacity of the cache memory 140, the cache data of all the cache entries may not be cached (or stored) in the cache memory 140. In this case, a cache entry with a relatively high score (priority) is cached preferentially to a cache entry with a relatively low score. The score values are computed based on a predetermined function or the like so that an object on which the use of caching has a higher effect has a higher score value. For example, an object having a high load of the RIP processing experiences a higher effect when reusing cache data.

Further, reading cache data from the cache memory 140 may require a certain amount of overhead time regardless of the data size of the cache data, because of the protocol for the preparation, completion, or the like of the reading operation. The amount of overhead time for cache data having a small size is relatively large. The smaller the size of cache data is, the shorter the time required to perform RIP processing on the cache data from the original PDL data may be. In some cases, drawing based on the original PDL data may be faster than drawing based on read cache data. Therefore, the smaller the size of cache data is, the lower the effect or significance of the caching of the RIP processing result of the corresponding object may be.

Furthermore, the larger the number of times the same object is drawn is, the higher the effect or significance of the caching of the RIP processing result of the corresponding object may be.

In the first exemplary embodiment, the computation of scores of individual cache entries is based on the above assumption.

Examples of parameters for determining a score include the kind of an object. Since the load of the RIP processing for images (bitmaps) are generally higher than that of fonts or graphics (figures), the images (bitmaps) may provide a higher effect of caching and therefore have a higher score.

The complexity of an object may also be used as a parameter for determining a score. The complexity of an object may be defined by, for example but not limited to, the number and type of sub-objects included in the object. Specifically, an object such as an object corresponding to a template document, for example, a form, is represented by the combination of sub-objects such as an image and text. The complexity of such objects may be determined by, for example, calculating the product of the number of sub-objects belonging to each kind of object and a weight unique to the kind and summing the products for all kinds of objects. A weight unique to each kind of object is a positive number having a large value for a kind having a high effect of caching. For example, weights assigned to images may be higher than weights assigned to graphics and text. The higher the complexity determined in the above manner is (for example, the higher the value of the complexity is), the higher the score may be. It is to be understood that the complexity may be determined using any method other than that in the above example. The complexity may also be defined by taking into account the length (or data size) of PDL data describing an object, the number of commands included in the data, or the like.

Further, an equal weight may not necessarily be assigned to sub-objects having the same kind of object, but different weights may be assigned to the individual sub-objects in accordance with the attribute of the sub-objects (such as the size of images expanded into bitmaps or the kind of the processing necessary to drawing the object).

For example, in the case of images, an object that requires color space conversion (for example, RGB-to-CMYK conversion) may require a higher processing load than otherwise, and weights may differ depending on whether color space conversion is used or not. Additionally, an object having a low magnification factor for drawing may require a high processing load, and weights may differ in accordance with the magnification factor. Alternatively, weights may differ in accordance with the angle of rotation by which original image data is rotated for drawing. Comparing different angles of rotation in terms of processing load, for example, an angle of rotation of 0 degrees may cause the lowest processing load and angles of rotation in steps of 90 degrees, such as 90 degrees, 180 degrees, and 270 degrees, may cause a higher processing loads than an angle of rotation of 0 degrees but cause a lower processing load than other free angles of rotation. Moreover, as the size of the original image data to be subjected to the above color space conversion or processing such as magnification or rotation increases, the number of pixels to be processed may increase, resulting in the higher processing load. Accordingly, weights may differ in accordance with the number of pixels of the original image data.

Alternatively, regardless of the kind of object, weights may differ in accordance with whether the object has a rectangular shape (for a font, the term "shape" does not mean the shape of the font itself but means the shape of the bitmap representing the font) or not, that is, in accordance with whether clipping has been performed or not (rectangular objects may require no clipping while non-rectangular objects may require clipping). Generally, a rectangular object (an object for which clipping has not been performed) may cause a lower processing load.

Also in the case of font objects, like image objects, weights may differ in accordance with whether the objects are rotated or not or in accordance with the angle of rotation.

Further, the drawing of an object with smooth shading (gradation) may cause a high processing load. In general, smooth shading causes a lower processing load than that the drawing of an image but causes a higher processing load than the drawing of graphics or text. Accordingly, different weights may be used in accordance with whether to perform smooth shading or not. In addition, the processing load may change in accordance with the amount of change in color caused by performing smooth shading on one object. Thus, in a case where smooth shading is performed, weights may differ in accordance with the amount of change in color during smooth shading.

The total weight assigned to one object may be determined by integrating (such as multiplying or adding) the weights for the various illustrative attribute parameters described above (such as whether color space conversion is performed or not, the magnification factor, the angle of rotation, whether clipping is required or not, and whether smooth shading is required or not). The specific calculation method for integration may be based on implementations such as how to determine a weight value.

The size of PDL data describing an object may also be used as a parameter for determining a score. For example, a larger amount of time may be required to interpret PDL data having a larger size, and therefore the load of the RIP processing may be larger. Thus, in an example, the larger the size of PDL data is, the higher the score may be.

On the basis of a similar assumption, the time required to perform RIP processing on PDL data describing an object may be used as a parameter for determining a score. For example, the time required for the RIP processing may be determined when RIP processing is performed on the PDL data of the object.

The size of the cache data (i.e., bitmap or intermediate language data obtained as a result of RIP processing) of an object may also be used as a parameter for determining a score. For example, for the reasons described above, the smaller the size of the cache data of an object is, the lower the effect or significance of caching the RIP processing result of the object may be. Thus, in an example, the larger the size of the cache data is, the higher the score may be. Furthermore, an amount of time corresponding to the size of the data (proportional to the number of pixels) may be required to draw cache data in the bitmap format on a page (that is, combine cache data in the bitmap format with print image data of a page). In this sense, therefore, the size of the cache data may be used as a parameter for determining a score.

On the basis of a similar assumption, furthermore, the time required to transfer the cache data of an object between the cache memory 140 and the RIP units 120 may also be used as a parameter for determining the score of the object. For example, the longer the time required for the transferring operation is, the relatively lower the amount of overhead time for the cache transfer may be, resulting in a relatively low penalty being caused by caching (in other words, the higher the effect of caching may be).

Further, when intermediate language data is cached, the time required for the RIP units 120 to perform RIP processing on cache data in the intermediate language format into the bitmap format may be used as a parameter for determining a score. The shorter the time required for the RIP processing is, the higher the effect of reusing the cache data may be, resulting in the higher score.

Each of the RIP units 120 starts RIP processing on an object by querying the cache management unit 130 as to whether the cache management unit 130 contains the cache data of the object or not, and uses the cache data of the object if the cache management unit 130 contains the cache data. In this case, the larger the number of times the query described above has been sent is, the higher the value of caching may be. Therefore, the cumulative number of queries may also be used as a parameter for determining a score. The larger the cumulative number of queries is, the higher the score may be.

The cumulative number of queries on each cache entry is monotonically increasing over time (that is, non-decreasing). In an example, therefore, in accordance with the monotonic increase in the cumulative number of queries over time, the scores of all the cache entries may be monotonically increasing.

Scoring is equivalent to ranking the values of caching indicating the degree to which the cache data of cache entries is worth caching. Thus, in another example, the scores of all the cache entries may be normalized into values in a predetermined range each time determination if performed. In this case, the values of the scores may not necessarily increase in accordance with the increase in the cumulative number of queries. However, if the amount by which the cumulative number of queries on a given cache entry is increased is larger than that on any other cache entry, the rank of the score of the given cache entry increases in all the cache entries.

The above parameters are merely examples, and other parameters may also be used. Scores may be computed based on one or more of the parameters. For the computation, the cache management unit 130 may use, for example, a function to which at least one of the above parameters is passed as an argument or may use a table in which a score is registered in association with at least one of the above parameters. In the related art, a function or table used to compute a score representing a caching priority in the above manner is used, and such an existing function or table may be used.

Referring back to FIG. 2, the "object attribute" item registered in the entry management table 132 contains information regarding at least one attribute item of an object. Examples of the information in the "object attribute" item may include the kind of the object, the size of the PDL data representing the object, and the complexity of the object. The information regarding the above attribute items may be determined by, for example but not limited to, analyzing PDL description of the object using the method given in the previous description of score. Each of the above attribute items may be used for the computation of a score described above, by way of example.

The cache management unit 130 refers to the entry management table 132, and responds to the read or write access to the cache memory 140 from each of the RIP units 120. The cache management unit 130 further updates the data contents of the entry management table 132 in accordance with the above access or the like. The process operation of the cache management unit 130 will be described in detail below with reference to a specific example.

Each of the RIP units 120 performs RIP processing on PDL data of the page allocated thereto. If the cache data of an object in the page is stored in the cache memory 140, the RIP unit 120 may use the cache data to generate print image data of the allocated page. Then, the RIP unit 120 sends the generated print image data of the page to the print control device 210.

Among the elements included in the print document conversion system 100 described above, the cache memory 140 may be composed of, for example, a high-speed readable/writable memory such as a random access memory. The other elements, except for the cache memory 140, that is, the job management unit 110, the RIP units 120, and the cache management unit 130, may be implemented by causing a computer to execute a program describing the functions of the elements described above and the functions of elements described below. In an example, the job management unit 110, the RIP units 120, and the cache management unit 130 may be implemented in a common single computer. In this case, information may be exchanged among the elements via, for example, inter-process communication or inter-thread communication. In another example, the job management unit 110, the RIP units 120, and the cache management unit 130 may be implemented in different computers. In this case, information may be exchanged among the elements using, for example, a protocol of a network over which the elements are connected. In still another example, two or more of the elements may be implemented in a single computer so that the entirety of the print document conversion system 100 may be implemented with a smaller number of computers than the number of elements. By way of example, the job management unit 110 and the cache management unit 130 may be mounted in the same computer, and databases managed by the job management unit 110 and the cache management unit 130 (for example, the object information managed by the job management unit 110 and the entry management table 132 managed by the cache management unit 130) may be centralized. In either case, the cache memory 140 is established in a memory on a computer in which the cache management unit 130 is mounted. In either case, furthermore, a single-processor computer or a multiprocessor computer may be used. When a multiprocessor computer is used, individual processor cores of a multiprocessor may be allocated to the individual RIP units 120.

The printer engine 220 may be a piece of printing hardware that prints an image represented by print image data on paper using colorants such as inks and toners. The print control device 210 is a device that controls the printer engine 220, and communicates with the print document conversion system 100 via a communication cable or a network (which may be the same as or different from the network established between the host computer 200 and the print document conversion system 100). Through the communication, the print control device 210 receives print image data of the individual pages or exchanges various kinds of control information necessary for printing control. The print control device 210 also stores received print image data of the individual pages, and supplies the stored print image data to the printer engine 220 in accordance with the order of printing. The printer engine 220 prints the received print image data on paper.

In a system where multiple RIP units 120 operate in parallel while reusing the RIP processing results via the cache memory 140, when one of the RIP units 120 (referred to as a "first RIP unit") is to start performing RIP processing on a certain object, another RIP unit 120 (referred to as a "second RIP unit") may be executing RIP processing on the object. In this situation, cache data obtained as a result of the RIP processing on the object is not in the cache memory 140. In this situation, the first RIP unit may have the following two options: The first option may be that the first RIP unit waits for the second RIP unit to complete the RIP processing and uses the cache data that is registered in the cache memory 140 at the time when the RIP processing is completed. The second option may be that the first RIP unit performs RIP processing on PDL data of the same object without waiting for the second RIP unit to complete the RIP processing. In an existing cache management method based on the RIP processing results, the cache memory merely returns a response indicating whether cache data is in the cache memory or not (that is, a "Hit" or a "Miss") in response to a query from the first RIP unit. In the above situation, a response indicating no cache data of the queried object ("Miss") is returned from the cache memory to the first RIP unit. In this case, the first RIP unit may have no information on whether or not another RIP unit is currently creating the cache data of the object, and therefore may have no option to choose. That is, the first RIP unit may merely perform RIP processing on PDL data of the object. Then, the first RIP unit may redundantly register the result of the RIP processing in the cache memory in which the result of the RIP processing performed by the second RIP unit has been registered.

By contrast, in the first exemplary embodiment, if the cache data of an object queried by the first RIP unit is currently being created by the second RIP unit but the creation has not been completed, the cache management unit 130 notifies the first RIP unit of this state to allow the first RIP unit to take measures in accordance with the state. The details of this configuration will be described below.

State Transitions in First Exemplary Embodiment

Figure 3:
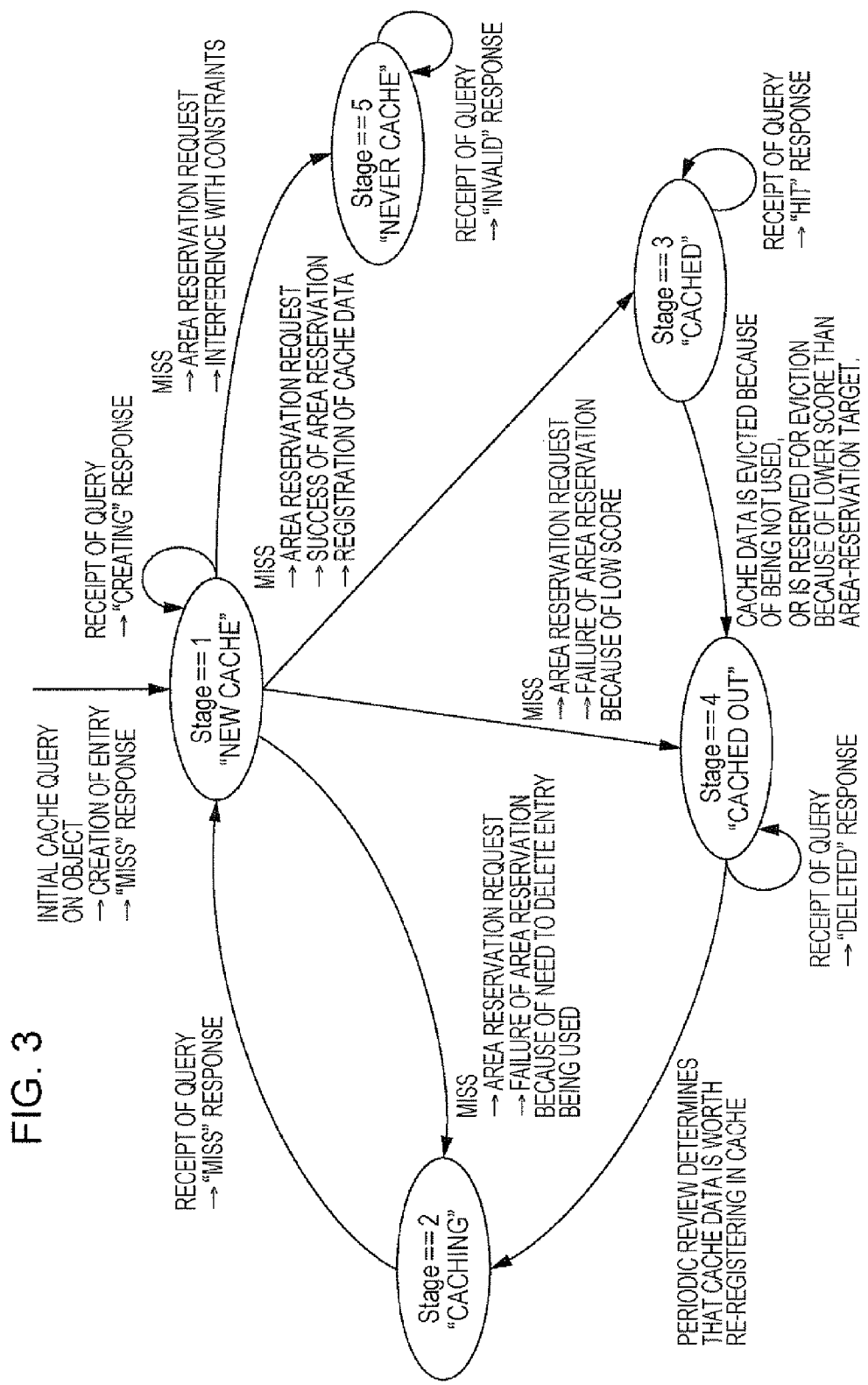
FIG. 3 illustrates state transitions of a cache entry among five stages according to the first exemplary embodiment.

First, stages of a cache entry which are used for management in the cache management unit 130 will be described with reference to FIG. 3. In the first exemplary embodiment, the cache entry may have five stages (or statuses): "New Cache", "Caching", "Cached", "Cached Out", and "Never Cache". For convenience of description, serial numbers are assigned to the five stages in sequential order starting with "1". FIG. 3 illustrates state transitions among the five stages.

Stage 1

"New Cache" (new cache, that is, cache data "currently being created") is a stage indicating that the cache data of the cache entry is currently being created and is not in the cache memory 140. Upon receipt of an initial query on cache data of a certain object from any of the RIP units 120, the cache management unit 130 generates a cache entry corresponding to the object, sets the stage of the cache entry to "New Cache", and returns a "Miss" ("no cache data") response to the RIP unit 120, thereby causing the RIP unit 120 to start performing RIP processing on the object (that is, to start creating the cache data).

If a query on a cache entry at the "Caching" stage described below is sent from any of the RIP units 120, the entry transitions to the "New Cache" stage.

If a query on a cache entry at the "New Cache" stage is sent from any of the RIP units 120, the cache management unit 130 returns a response of a code called "Creating". The "Creating" response indicates that the data of the cache entry is currently being created by another RIP unit 120.

Stage 2

"Caching" (waiting) is a state of waiting until a cache area is made available. The "Caching" stage is substantially the same as the "New Cache" stage described above in that the cache data of the cache entry is not in the cache memory 140, but is different from the "New Cache" stage described above in that no RIP units 120 are currently creating the cache data.

One example of the transition to the "Caching" stage is the transition from stage 1 described above, i.e., the "New Cache" stage. That is, when any of the RIP units 120 is to create cache data of a cache entry at the "New Cache" stage, if the cache memory 140 has no available area to store the cache data, the cache entry transitions to the "Caching" stage. A cache entry at the "Caching" stage is maintained unprocessed until the cache data of any other cache entry has been evicted (or deleted) from the cache memory 140 over time and an area becomes available for the cache entry.

It is to be noted that the transition from the "New Cache" stage to the "Caching" stage is based on the determination that the cache entry is worth caching. If it is determined that the cache entry is not worth caching (for example, if the score of the cache entry is lower than that of any other cache entry whose cache data is currently in the cache memory 140, the transition to the "Cached Out" (out of cache) stages described below rather than to the "Caching" stage occurs.

Another example of the transition to the "Caching" stage may be the transition from stage 4 described below, i.e., the "Cached Out" (out of cache) stage (the details of which will be described in the description of the Cached Out" stage).

If a query on a cache entry at the "Caching" stage is sent from any of the RIP units 120, the cache management unit 130 causes the cache entry to transition to stage 1, i.e., "New Cache", and returns a "Miss" ("no cache data") response. In response to the response, the RIP unit 120 starts a process for creating the cache data of the cache entry.

Stage 3

"Cached" (caching completed) is a state in which the cache data of the cache entry has been stored in the cache memory 140. The cache entry transitions to the "Cached" stage from stage 1 described above, i.e., "New Cache". That is, when any of the RIP units 120 is to create cache data of a cache entry at the "New Cache" stage, the cache entry transitions to the "Cached" stage when an area for storing the cache data is allowed to be reserved in the cache memory 140 and the cache data is created and registered in the area.

Upon receipt of a query on a cache entry at the "Cached" stage from any of the RIP units 120, the cache management unit 130 returns a "Hit" ("presence of cache data") response. The RIP unit 120 that has received the response does not perform RIP processing on the PDL data but receives the cache data from the cache memory 140 and generates an image of the object.

A cache entry at the "Cached" stage may transition to the "Cached Out" (out of cache) stage if the available capacity in the cache memory 140 becomes low. In summary, when a request for registering the cache data of a new cache entry in the cache memory 140 is issued, if the amount of the cache data exceeds the available capacity in the cache memory 140, the cache data of an entry selected from among cache entries at the "Cached" stage is evicted (or deleted) from the cache memory 140. For example, a cache entry whose cache data is not being used (or referred to) by any of the RIP units 120 at this time may be evicted from the cache memory 140. A cache entry whose cache data has been evicted in the above manner transitions from the "Cached" stage to the "Cached Out" stage. For a cache entry whose cache data is being used (or referred to) by any of the RIP units 120 at this time, it is not suitable that the cache data be evicted until it has been used in order to avoid any potential adverse effect on the RIP unit 120 that is using the cache data; however, the cache data may be evicted after being used. Therefore, an "eviction reservation" may be made by causing the cache entry to transition to the "Cached Out" stage during the use of the cache data. The range of cache entries to be evicted may be narrowed down by score.

Stage 4

"Cached Out" (out of cache, that is, evicted) is a state in which the cache data of the cache entry has been evicted from the cache memory 140 or is reserved for eviction. The cache data of a cache entry at this stage is not in the cache memory 140 (cache data under the "eviction reservation" is in the cache memory 140 at the present time but will be deleted in the very near future). In addition, the above cache data is not currently being created by any of the RIP units 120. Cache data under the "eviction reservation" is in the cache memory 140 at the present time but will be deleted in the very near future.

As described above, the transition from stage 3, i.e., "Cached", to the "Cached Out" stage occurs.

In a specific case, in response to a "creating" response indicating that image data of a document element at stage 1 is not in the cache memory and is currently being created by any data processing apparatus, a cache entry at the "New Cache" stage may be made to transition to the "Cached Out" stage. For example, if it is determined that the score of the cache entry is so low that the cache entry is not sufficient worth caching, the cache entry may be made to transition to the "Cached Out" stage without registering the cache data of the cache entry. For example, when the score of the cache entry is the lowest among the scores of all the cache entries in the cache ("Cached"), it may be determined that the score of the cache entry is so low that the cache entry is not sufficient worth caching. Alternatively, a score threshold for determining the value of caching may be determined, and if a cache entry has a lower score than the threshold, the cache entry may be made to transition to the "Cached Out" stage without caching the cache data of the cache entry (see an example illustrated in FIG. 24 described below).

Upon receipt of a query on a cache entry at the "Cached Out" stage from any of the RIP units 120, the cache management unit 130 returns a "Deleted" ("cache data having been deleted") response. The RIP unit 120 that has received the response performs RIP processing on the original PDL data of the object to generate print image data of the object. At this time, the RIP unit 120 does not register the generated print image data in the cache memory 140 because it has been determined that the cache data of the cache entry is not worth caching.

The "Cached Out" stage is substantially the same as the "New Cache" stage and the "Caching" stage described above in that the data of the cache entry is not in the cache memory 140. In the case of "New Cache" and "Caching", a "Miss" response is returned in response to a query, whereas in the case of "Cached Out", a "Deleted" response is returned in response to a query. The difference between the two responses is that in the case of a "Miss" response, the querying RIP unit 120 registers image data created by RIP processing in a cache, whereas in the case of a "Deleted" response, the querying RIP unit 120 does not register image data created by RIP processing in a cache. That is, for a cache entry at the "Cached Out" stage, the cache data is not registered in the cache memory 140 even though a query is sent from any of the RIP unit 120. The processing in response to a "Deleted" response may prevent or minimize the overhead of the processing which is caused by, for example, repeated entry and exit of cache data of a cache entry regarded as being little worth caching to and from the cache memory 140. In the first exemplary embodiment, therefore, cache data of a cache entry regarded as being little worth caching is not returned to the cache memory 140 for a certain period of time.

However, as the number of queries on such a cache entry increases, the score of the cache entry increases accordingly and the cache entry may be relatively more worth caching than another cache entry whose data is in the cache memory 140. Thus, in the first exemplary embodiment, cache entries at the "Cached Out" stage may be reviewed periodically (see, for example, an example illustrated in FIG. 15 described below). Specifically, for example, the score of a cache entry at the "Cached Out" stage may be periodically checked, and if the score of the cache entry is sufficiently high so that the cache entry becomes of value of being re-registered, the entry may be made to transition to the "Caching" stage described above. When a certain cache entry transitions from the "Cached Out" stage to the "Caching" stage, the entry transitions to the "New Cache" stage upon arrival of a query on the entry later. Then, a process for creating and registering the cache data of the entry is started.

Stage 5

"Never Cache" (not to be cached) is a state in which the object corresponding to the cache entry interferes with predetermined constraints and is determined to be an object not to be cached. The constraints may be conditions that define an object determined to be not worth caching without being compared in, for example, score with other cache entries.

For example, drawing an excessively small object or an excessively simple object (for example, only one straight line) by an RIP unit 120 itself may be faster than drawing it by reading cache data from the cache memory 140. Thus, conditions (for example, a threshold) may be set for each of parameters of the object such as size and complexity, If the size or complexity of an object to be cached meets the corresponding conditions (for example, if the size is smaller than a threshold or the complexity is lower than a threshold), the cache entry corresponding to the object is made to transition to the "Never Cache" stage. The conditions for the parameters such as size or complexity may be combined using AND (to transition to the "Never Cache" stage when all the conditions are met) or OR (to transition to the "Never Cache" stage when any of the conditions is met).

In terms of efficiency or the like, the shape of an object to be cached may be limited to a rectangular shape whose sides are parallel to the vertical and horizontal edges of a page. In this case, an object having a non-rectangular shape interferes with the constraints, and the cache entry of the object is at the "Never Cache" stage.

Upon receipt of a query on a cache entry at the "Never Cache" stage from any of the RIP units 120, the cache management unit 130 returns an "Invalid" ("invalidation of caching") response. In accordance with the response, the RIP unit 120 performs RIP processing on the PDL data of the object (and the RIP processing result is not cached).

The stages of cache entries have been described. The stages described above are those that a cache entry registered in the entry management table 132 of the cache management unit 130 may have. Incidentally, upon receipt of an initial query on a certain object, the cache management unit 130 generates a cache entry for the object and stores it in the entry management table 132. Therefore, no cache entry exists prior to the initial query, or no stage of cache entry exists. However, since cache entries correspond to objects, a cache entry corresponding to an object may potentially exist even before the initial query is received. On the basis of the above assumption, before the initial query is received, the state of the cache entry that potentially exists may belong to a state in which "the cache data is not in the cache memory 140 or is not currently being created by any of the RIP units 120".

Processing Procedure of RIP Unit 120

Next, an example of the processing procedure of each of the RIP units 120 will be described with reference to FIGS. 4 to 6.

The RIP units 120 interpret PDL data of individual pages allocated thereto by the page allocation unit 112 in sequence, starting from the beginning. In this process, a procedure illustrated by way of example in FIGS. 4 to 6 is executed each time PDL data of a new object is found.

Figure 4:
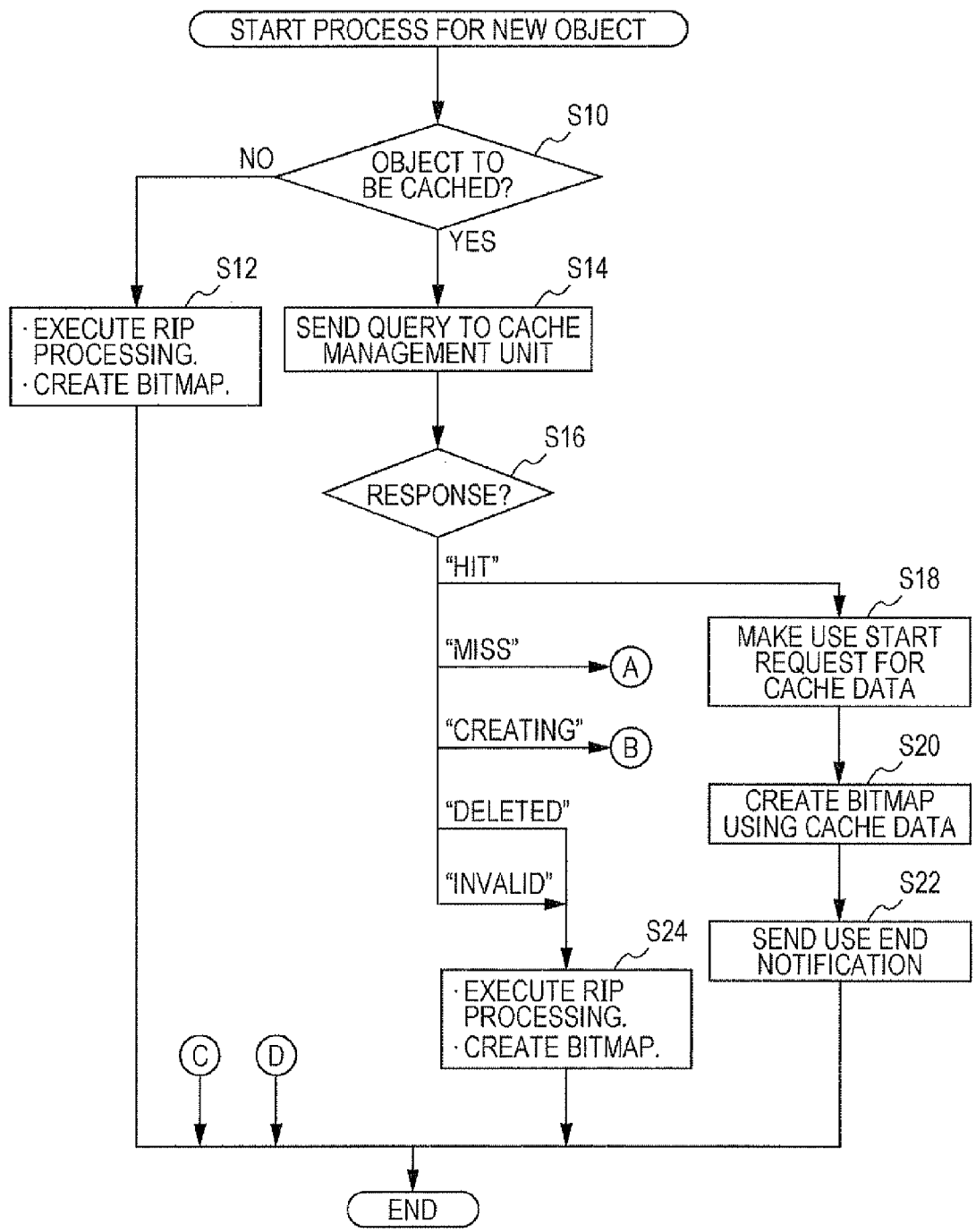
FIG. 4 is a flowchart illustrating an example of an overall processing procedure of a RIP unit.

In this procedure, as illustrated in FIG. 4, first, it is determined, based on the PDL data of the object, whether or not the object is an object to be cached (S10). For example, in PDF, which is a PDL, objects are generally classified into a type that is possibly used repeatedly, including forms, images (bitmaps), and fonts, and a type that is not. Objects of the former type are assigned IDs so that objects used at plural positions in the print document data are invoked using the same ID. In other words, objects without IDs are objects of the type that will not be used repeatedly. Accordingly, it may be determined that objects assigned IDs are objects to be cached and objects assigned no IDs are objects not to be cached. PDLs other than PDF may allow objects to be classified in a similar manner, and determination similar to that in S10 may be used for such PDLs.

If it is determined in S10 that the object is not an object to be cached, the RIP unit 120 interprets the PDL data of the object and performs drawing to generate a bitmap image of the object. The generated bitmap image is combined with the print image data of the page currently being created (S12), and the RIP processing for the object is completed. At this time, the bitmap image of the generated object is not cached.

If it is determined in S10 that the object is an object to be cached, the RIP unit 120 sends a query on the state of the cache entry of the object to the cache management unit 130 (S14). The query includes identification information specifying the object. For example, like PDF, if the object to be cached is assigned an ID, the query may be sent using the ID. Since cache entries and objects have a one-to-one correspondence, the ID of an object is used to specify the cache entry corresponding to the object. For example, if the ID of an object is used as the ID of a cache entry, the ID of the object may be used to specify the corresponding cache entry. In PDL in which no ID is assigned to an object, for example, a set of a PDL command describing the object and an argument may be included in the query as identification information. In this case, a set of a PDL command and an argument (or identification information matched with the set) may be registered with each cache entry as identification information on the object corresponding to the entry.

After sending the query, upon receipt of a response in response to the query from the cache management unit 130, the RIP unit 120 determines the value represented by the response (S16). As described above, five responses of the cache management unit 130 are available in response to a query: "Hit", "Miss", "Creating", "Deleted", and "Invalid".

If the response from the cache management unit 130 is a "Hit", the RIP unit 120 sends a use start request for the cache data corresponding to the object to the cache management unit 130 (S18). The request includes an ID specifying the cache entry corresponding to the object. In accordance with the request, the cache management unit 130 provides the RIP unit 120 with the cache data of the requested cache entry from the cache memory 140. The RIP unit 120 generates a bitmap image of the object using the cache data, and combines the generated bitmap image with the print image data of the page currently being created (S20). Specifically, if the cache data is in the bitmap format, the cache data may be directly combined with the print image data of the page. If the cache data is in the intermediate language format such as a display list, the object may be drawn based on the cache data to generate a bitmap image, and the bitmap image may be combined with the print image data of the page. When the RIP processing of the cache data is completed in the above manner, the RIP unit 120 sends a notification ("use end notification") indicating that the use of the cache entry ends to the cache management unit 130 (S22). The notification may include an ID specifying the cache entry that has been used. With the notification, the RIP processing on the object ends.

Next, a processing procedure performed if it is determined in S16 that the response from the cache management unit 130 is a "Miss" will be described. As described above, the "Miss" response corresponds to an instruction for "creating and registering cache data because the cache data does not exist". Accordingly, the RIP unit 120 executes a processing procedure illustrated by way of example in FIG. 5.

Specifically, first, the RIP unit 120 issues an area reservation request to the cache management unit 130 (S30). The area reservation request may be a request for reserving an area to cache the RIP processing result of the object in the cache memory 140. The area reservation request may include, for example, the ID of the cache entry corresponding to the object, and information regarding the size of the area (or data capacity) to be reserved. The size of the area to be reserved may be the data size of the RIP processing result (in the bitmap format or in the intermediate language format) of the object, and may be determined using the analysis of the PDL data. In many PDLs, for example, the image size of an object such as an image, a form, or a font is defined as an argument of a drawing command. In the case of such PDLs, the data size of cache data may be determined using information regarding the image size because the size of the cache data is proportional to the image size when the cache data is in the bitmap format. The amount of cache data in the intermediate language format may also be estimated using the analysis of the PDL data. Furthermore, since actual RIP processing allows the accurate determination of the amount of cache data in the intermediate language format, the amount of cache data may be stored in, for example, the entry management table 132, and may be referred to when an area for caching needs to be reserved again.

In accordance with the area reservation request, the cache management unit 130 determines whether it is possible to reserve the requested size of area or not (the details of which will be described below), and returns the determination result to the requesting RIP unit 120. The RIP unit 120 determines whether the response indicates success or failure of reservation (S31).

If it is determined in S31 that the response indicates the "success of reservation", the RIP unit 120 performs RIP processing on the PDL data of the object, and writes the RIP processing result in the reserved area (whose address is included in the response) (S32). Thus, cache data of the object is generated in the reserved area. Then, the RIP unit 120 generates a bitmap image of the object using the generated cache data, and combines the generated bitmap image with the print image data of the page currently being created (S34). When the generation of cache data and the combining of the cache data with the print image data of the page are completed, the RIP unit 120 issues a request for registering the cache data to the cache management unit 130 (S36). The request includes the ID of the cache entry. With the request, the RIP unit 120 ends the process on the object.

If it is determined in S31 that the response indicates the "failure of reservation", this means that the cache memory 140 has no room to cache the RIP processing result of the object. In this case, the RIP unit 120 interprets the PDL data of the object and performs drawing to generate a bitmap image, and combines the bitmap image with the print image data of the page (S38). Then, the RIP unit 120 ends the process on the object without caching the generated bitmap image.

Figure 6:
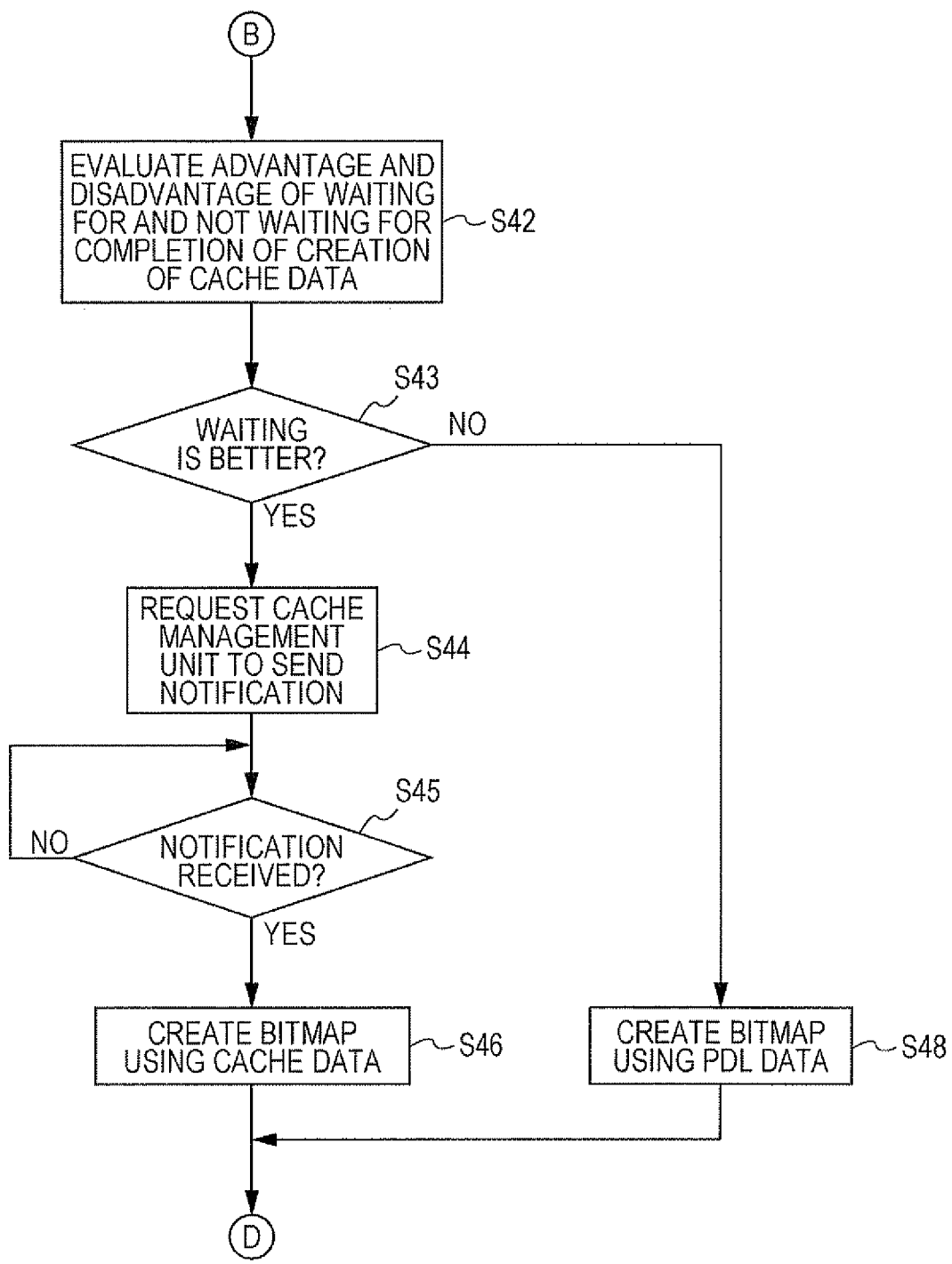
FIG. 6 is a flowchart illustrating an example of a processing procedure of a RIP unit upon receipt of a "Creating" response from the cache management unit.

Referring back to FIG. 4, if it is determined in S16 that the response from the cache management unit 130 is "Creating", the RIP unit 120 executes a processing procedure illustrated by way of example in FIG. 6. As described above, the "Creating" response means that the "queried cache data is currently being created by another RIP unit". In the first exemplary embodiment, the characteristic "Creating" response informs the RIP unit 120 that the cache data of the target object is currently being created by another RIP unit. Thus, the RIP unit 120 may have options to wait for the other RIP unit to complete the creation of cache data and to perform RIP processing without waiting. The RIP unit 120 may fixedly set the option to select or dynamically select either option in accordance with the situation. In FIG. 6, an example of dynamically selecting waiting or not waiting is illustrated.

In the illustrated procedure, the RIP unit 120 (referred to as a "first RIP unit") evaluates the effects of a method in which the first RIP unit uses the cache data after another RIP unit 120 (referred to as a "second RIP unit") has completed the creation of the cache data and the effects of a method in which the first RIP unit performs RIP processing on the PDL data of the object. That is, the first RIP unit determines which method is suitable for the more quick completion of the process (S42). The evaluation may be based on, for example, at least one of the following illustrative parameters (a1) to (f):

(a1) The RIP processing load involved when a bitmap image is created by performing RIP processing on the PDL data of the object.
(a2) The RIP processing load involved when intermediate language data is created by performing RIP processing on the PDL data of the object (the RIP processing load may be used for caching intermediate language data).
(b) The data size of the cache data (or the time required to transfer the cache data to the first RIP unit 120).
(c) The load of the processing for converting the cache data of the object into a bitmap image and combining the bitmap image with the print image data of a page.
(d1) The processing performance of the first RIP unit (the value under ideal conditions, such as the performance of the CPU; there is no need to take this parameter into account if all the RIP units have the same processing performance).
(d2) The processing performance of the second RIP unit (the same as above).
(e1) The current processing load on the first RIP unit.
(e2) The current processing load on the second RIP unit.
(f) The degree of progress of the second RIP unit that is creating the cache data.

Among the above parameters, the parameters (a1) and (a2) may be calculated using a method similar to that when the load monitoring unit 114 calculates the load of the RIP processing for a page as described above. In addition, for example, when the load monitoring unit 114 determines the load of the RIP processing for a page, the load of the RIP processing for each object in the page may be determined and registered in a database using an ID of an object as a key so that the RIP units 120 may refer to the registered loads.

The parameter (b) may be obtained from the entry management table 132 of the cache management unit 130.

The parameter (c) does not require the conversion of cache data into the bitmap format if the cache data is in the bitmap format, and represents the load of the processing required to combine the cache data with the print image data of a page. The processing load required for the combining operation corresponds to the size of bitmap data, and may be determined by multiplying the size by a coefficient determined through an experiment, a simulation, or the like. If the cache data is in the intermediate language format, for example, the load may be determined from the cache data by an existing method using the number of pixels used in the drawing operation, the type of the image processing to be performed in the drawing operation, and the like. For example, for the number of pixels, if intermediate language instructions include an instruction for filling in a rectangle and an instruction for drawing diagonal lines of a rectangle having the same shape and size as the above rectangle, the instructions have substantially the same data size. However, the former instruction requires a larger number of pixels used in the drawing operation, and also requires a larger load of the processing. Therefore, the parameter (c) may be computed based on the kind of the intermediate language instruction and based on the size of the object and the like indicated by the argument or the like of the instruction. The intermediate language instruction defines the shape of the object to be drawn by using pixels. For example, filling in a rectangle and drawing diagonal lines in a rectangle are performed in accordance with different instructions. Examples of the kind of image processing to be performed in the drawing operation include color space conversion, magnification, rotation, and smooth shading (gradation), as described by way of example in the foregoing description of the score computation method. Therefore, the processing load regarding the parameter (c) may be computed by, for example, defining a function or the like for computing a processing load for each kind of image processing and by inputting the size of the image represented by the cache data or the parameters for image processing (such as whether the image processing is performed or not, the magnification factor, the angle of rotation, and the amount of change in color during gradation) to the function. When multiple types of image processing are performed on one object, the sum of the processing loads for the individual types of image processing may be determined as the processing load regarding the parameter (c) of the object. (The scores described above may also be computed using a similar method.)

The parameters (d1) and (d2) may be known values, and may be registered in advance by the system administrator. The parameters (d1) and (d2) are used also in the load monitoring unit 114 and may therefore be shared.

The parameters (e1), (e2), and (f) may be obtained from the load monitoring unit 114.

In the evaluation processing of S42 using the above parameters, first, for example, the time T1 required for the first RIP unit to generate a bitmap image of the object by performing RIP processing on the PDL data of the object is estimated from the parameters (a1), (d1), and (e1). In this case, for example, the current actual processing performance may be determined by decreasing the parameter (d1) in accordance with the parameter (e1), and the evaluation value representing the time T1 described above may be determined by, for example, dividing the parameter (a1) by the actual processing performance.

Furthermore, similarly, the time T2 required to generate a bitmap image of the object is estimated from the parameters (b), (c), (d2), (e2), (f), and (a1) or (a2) by using the cache data after the second RIP unit has completed the creation of the cache data. The time T2 may be the sum of, for example, times T21, T22, and T23. The time T21 is a time taken until the second RIP unit currently creating the cache data has completed the creation of the cache data. The time T22 is an overhead time (which may be registered as a fixed value) of the protocol processing required to read the cache data to the first RIP unit from the cache memory 140. The time T23 is a time required for the first RIP unit to convert the read cache data into a bitmap image.

The evaluation value representing the time T21 (the time taken until the second RIP unit currently creating the cache data has completed the creation of the cache data) may be determined by performing calculations such as determining the remaining processing load R required until the creation of the cache data is completed from the parameter (a1) or (a2) (from the former when the cache data is in the bitmap format and from the latter when the cache data is in the intermediate language format) and also from the parameter (f), determining the current processing performance P2 of the second RIP unit from the parameters (d2) and (e2), and dividing the remaining processing load R by the processing performance P2.

The time T22 may be a fixed value, and may be registered in advance.

Further, the time T23 may be the sum of times T231 and T232. The time T231 is a time required to read the cache data to the first RIP unit from the cache memory 140. The time T232 is a time required for the first RIP unit to convert the read cache data into bitmap cache data. The time T231 may be determined from the parameter (b). The time T232 may be determined by performing calculations such as determining the current processing performance of the first RIP unit from the parameters (d1) and (e1) and dividing the parameter (c) by the determined processing performance.

The method to estimate the times T1 and T2 described above is merely an example, and any other method may be used. For example, the estimation may be performed using some of the illustrative parameters described above or using other parameters.

A method corresponding to the shorter one of the times T1 and T2 estimated in the manner described above may be used. Specifically, if the time T1 is shorter than the time T2, it is determined that the method in which the first RIP unit performs RIP processing on the PDL data without waiting for the creation of the cache data to be completed is better, whereas otherwise, it is determined that the method in which the first RIP unit uses the cache data after the creation of the cache data has been completed is better.

In the foregoing description, which method is better is determined by estimating and comparing the time required for one of the RIP units 120 to perform RIP processing on PDL data and the time required for one of the RIP units 120 to wait for another RIP unit currently creating cache data to complete the creation of the cache data. However, the above determination method is merely an example. For example, a simple determination based on a single parameter may be used, such as waiting for the completion of the creation of cache data if the kind of the object is an image and performing RIP processing without waiting for the completion if the kind of the object is not an image (for example, a form or a font). Another determination may be used such as waiting for the completion of the creation of cache data if the complexity of the object is greater than or equal to a predetermined threshold and not waiting for the completion if the complexity of the object is less than the threshold. It is to be understood that any other determination method may be used.

In S43, it is determined whether waiting is better or not as a result of the evaluation in S42. If it is determined in S43 that it is better that the first RIP unit 120 waits for the completion of the creation of the cache data, the first RIP unit 120 requests the cache management unit 130 to send a notification when the creation of the cache data (which may be specified by, for example, the ID of the cache entry) is completed and the cache data is registered (S44), and waits for the arrival of the notification (S45). When the notification arrives from the cache management unit 130, the first RIP unit 120 generates a bitmap image using the cache data, and combines the bitmap image with the print image data of a page (S46). More specifically, like the processing of S18 to S22, the processing of S46 may include three steps: making a use start request, generating a bitmap, and sending a use end notification.

If it is determined in 343 that it is better that the first RIP unit 120 does not wait for the completion of the creation of the cache data, the first RIP unit 120 performs RIP processing on the PDL data of the object to generate a bitmap image, and combines the bitmap image with the print image data of the page (S48). In this case, the generated bitmap or intermediate language data matches the data generated by the second RIP unit and registered in the cache memory 140, and therefore is not registered in the cache memory 140.

After the processing of S46 or S48, the process on the object ends.

Referring back to FIG. 4, if it is determined in S16 that the response from the cache management unit 130 is "Deleted", the RIP unit 120 that has received the response performs RIP processing on the PDL data of the object to generate a bitmap image, and combines the bitmap image with the print image data of the page (S24). In this case, the bitmap or intermediate language data generated in S24 is not registered in the cache memory 140 because it has been determined that the object is not worth caching.

Further, if it is determined in S16 that the response from the cache management unit 130 is "Invalid" (the "Never Cache" stage), the RIP unit 120 that has received the response performs RIP processing on the PDL data of the object to generate a bitmap image, and combines the bitmap image with the print image data of the page (S24). In this case, the bitmap or intermediate language data generated in S24 is not registered in the cache memory 140 because the object is not worth caching.

In the foregoing description, also in the case of an object corresponding to "Never Cache", in S14, the RIP unit 120 sends a query to the cache management unit 130, and in S24, the RIP unit 120 performs RIP processing on the PDL data of the object. However, the above operations may not necessarily be performed. Instead of the operations, the RIP unit 120 may determine whether the object is at the "Never Cache" stage or not (the processing load required for the determination itself is markedly small), and if it is determined that the object is at the "Never Cache" stage, the operation of sending a query to the cache management unit 130 may be omitted. Alternatively, the RIP unit 120 may locally cache the RIP processing result of the object determined to correspond to "Never Cache", and if the same object is drawn again, the RIP unit 120 may use the locally cached object to perform the drawing operation without sending a query to the cache management unit 130.

The "Cashed Out" stage (in response to which "Deleted" is returned) may be similar to the "Never Cache" stage in certain sense, but is different in that, as described above, for "Never Cache", the operation of sending a query to the cache management unit 130 may be omitted whereas for "Cashed Out", the above operation is not omitted. That is, in the case of an object at the "Cashed Out" stage, the score may change over time, and may be cached in the shared cache memory 140. Thus, it is necessary for the RIP unit 120 to send a query to the cache management unit 130 each time such an object is found.

Processing Procedure of Cache Management Unit 130

An example of the processing procedure of each of the RIP units 120 has been described. Next, an example of the processing procedure of the cache management unit 130 will be described with reference to FIGS. 7 to 15.

First, an example of the processing procedure executed by the cache management unit 130 upon arrival of a query (S14 in FIG. 4) from any of the RIP units 120 will be described with reference to FIG. 7.

In this procedure, the cache management unit 130 searches the entry management table 132 for a cache entry of the queried object (S50). In S50, the search may be performed using information specifying a cache entry (such as the ID of the object or the combination of the PDL command and the argument), which is included in the query, as a key. Then, it is determined whether the cache entry corresponding to the object is found or not (S52). If the cache entry is not found, a new cache entry corresponding to the object is created (S54). In the case of a method in which the ID of the object is used as the ID of the cache entry, the ID of the object included in the query may be set to the ID of the cache entry. Further, if the ID of the object does not exist, a unique ID is assigned to the new generated cache entry, and information specifying the cache entry, such as the combination of the PDL command and the argument, which is included in the query, is registered in the cache entry (not illustrated in FIG. 2). The cache management unit 130 further initializes or sets (S56) the values of the respective items for the cache entry in the entry management table 132 (see FIG. 2) by setting the stage of the cache entry to 1, i.e., to "New Cache", and setting the cumulative number of queries to 1. The object attribute information such as the kind of the object may be included in, for example, the query from the RIP unit 120, and may be set in the entry management table 132 by the cache management unit 130. The cache data size may also be set in a similar manner. Further, the cache management unit 130 initializes the value of the use counter to 0. The address of the cache area may be left undefined. The cache management unit 130 further computes the score of (the evaluation value indicating the value of caching for) the cache entry in the manner described above by using the object attribute (such as the kind of the object) or the cumulative number of queries, and registers the score in the entry management table 132. The cache management unit 130 also registers the identification information on the querying RIP unit 120 in the "RIP currently creating data" column. Then, the cache management unit 130 returns a "Miss" response to the querying RIP unit 120 (S58), and the process on the query ends. In accordance with the response, the RIP unit 120 starts creating the cache data for the object (see FIGS. 4 and 5).

If the queried cache entry is found from the entry management table 132 in S52, the cache management unit 130 increases the cumulative number of queries on the entry by 1 (S60). As described above, the larger the cumulative number of queries is, the higher the score may be. Thus, the score of the entry is updated in accordance with the increase in the cumulative number of queries (S60).

Then, the cache management unit 130 determines the stage of the cache entry (S62). As a result of the determination, if the stage is 1, i.e., "New Cache", a "Creating" response is returned to the querying RIP unit 120 (S64). If the stage is 2, i.e., "Caching", a "Miss" response is returned to the querying RIP unit 120, and the cache entry is made to transition to stage 1 (S66). In this case, the identification information regarding the querying RIP unit 120 is registered in the "RIP currently creating data" column for the entry in the entry management table 132. If the stage is 3, i.e., "Cached", a "Hit" response is returned to the querying RIP unit 120 (S68). If the stage is 4, i.e., "Cached Out", a "Deleted" response is returned to the querying RIP unit 120 (S70). If the stage is 5, i.e., "Never Cache", an "Invalid" response is returned to the querying RIP unit 120 (S72). After returning the response, the cache management unit 130 ends the process on the query. In accordance with the response, the querying RIP unit 120 executes the process illustrated in FIGS. 4 to 6.

Figure 8:
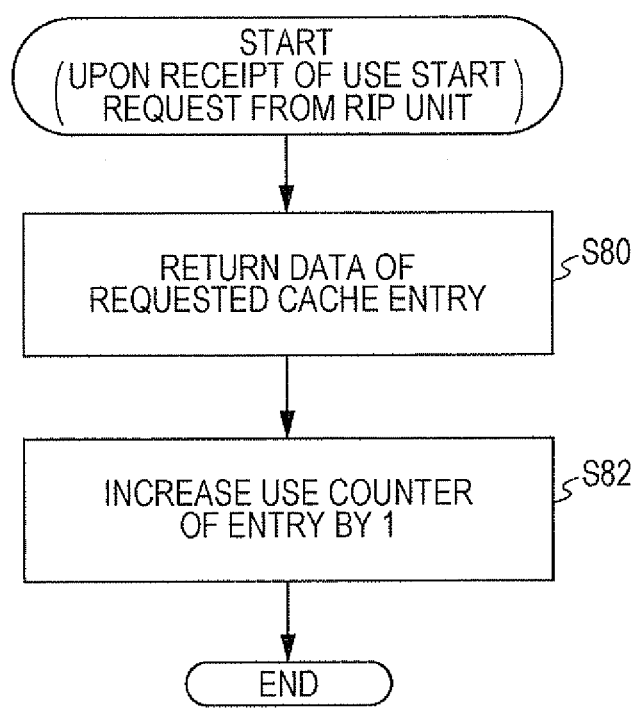
FIG. 8 is a flowchart illustrating an example of a processing procedure of the cache management unit upon receipt of a use start request from a RIP unit.

Next, an example of the processing procedure of the cache management unit 130 when a use start request for cache data is received from any of the RIP units 120 will be described with reference to FIG. 8.

In this procedure, the cache management unit 130 determines cache data requested by the received use start request from the cache memory 140, and returns the cache data to the requesting RIP unit 120 (S80). In this case, for example, the cache management unit 130 may search through the entry management table 132 using information specifying a cache entry, such as the ID, which is included in the received use start request, as a key to find a cache entry, and may read the cache data from the cache memory 140 in accordance with the information of the "address of cache area" column and the "size of cache data" column (see FIG. 2) for the found cache entry. Then, the cache management unit 130 increases the value of the use counter by 1 (see FIG. 2) of the cache entry (S82). Accordingly, increasing the number of RIP units 120 currently using the cache data of the cache entry by 1 is recorded.

Figure 9:
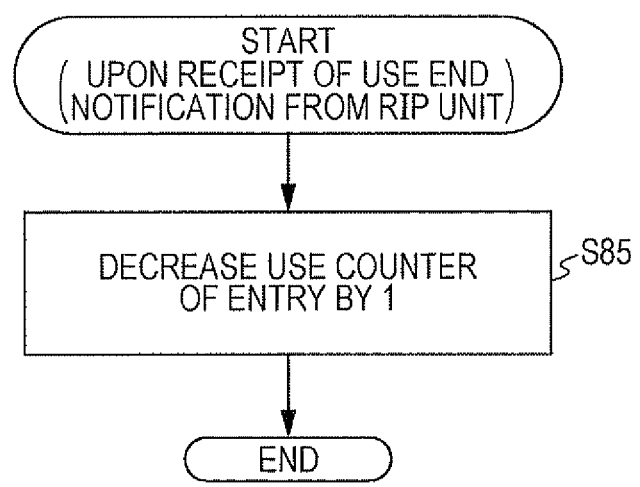
FIG. 9 is a flowchart illustrating an example of a processing procedure of the cache management unit upon receipt of a use end notification from a RIP unit.

Next, an example of the processing procedure of the cache management unit 130 upon receipt of a use end notification of cache data from any of the RIP units 120 will be described with reference to FIG. 9.

In this procedure, the cache management unit 130 specifies a cache entry for which the use end notification has been received from information specifying the entry, such as the ID, which is included in the received use end notification, and decreases the value of the use counter of the cache entry by 1 (S85). Accordingly, decreasing the number of RIP units 120 currently using the cache data of the cache entry by 1 is recorded.

Next, an example of the processing procedure of the cache management unit 130 upon receipt of an area reservation request for reserving an area for caching from any of the RIP units 120 will be described with reference to FIGS. 10 and 11.

Figure 10:
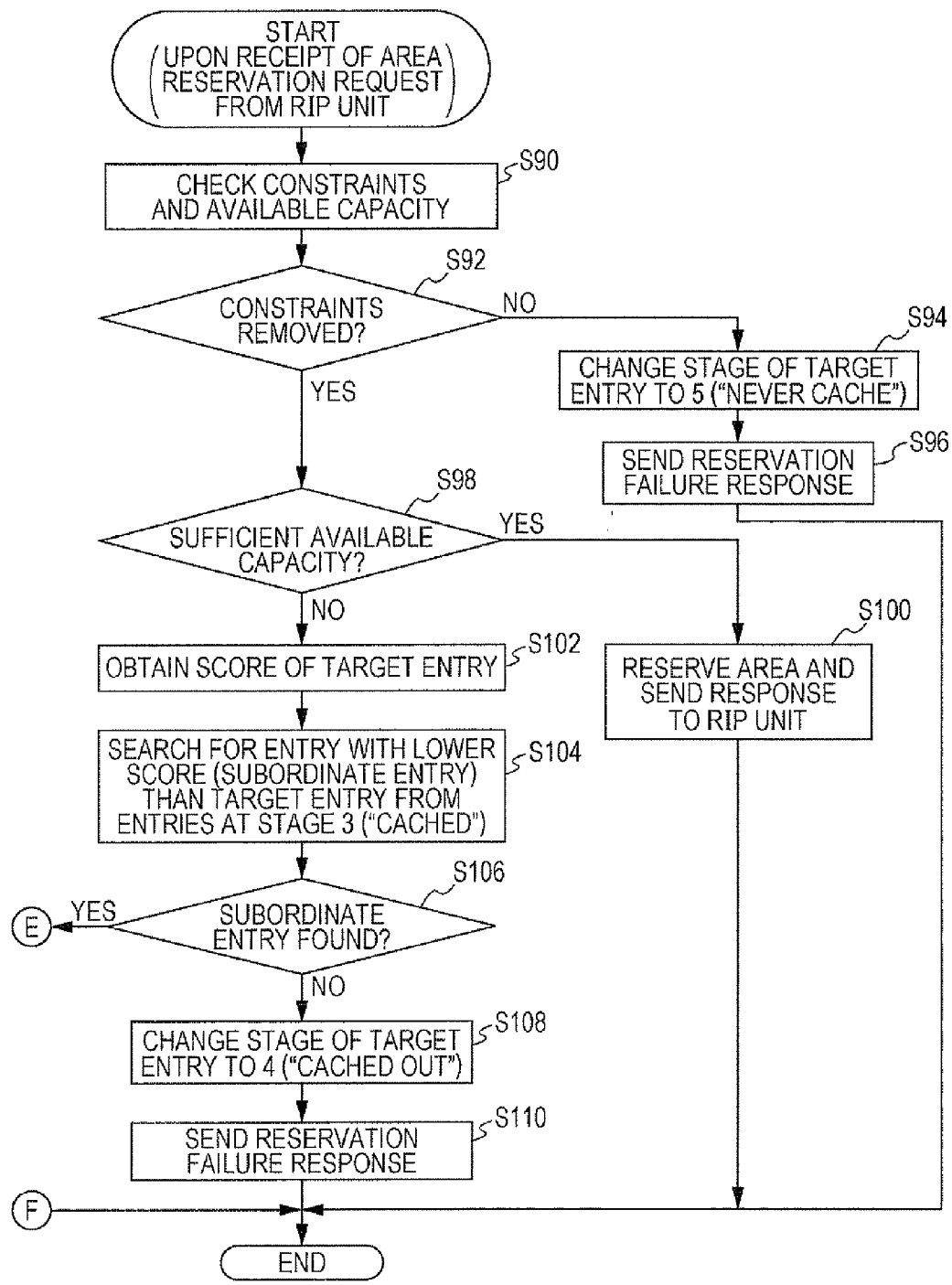
FIG. 10 is a flowchart illustrating an example of a processing procedure of the cache management unit upon receipt of an area reservation request from a RIP unit.

In this procedure, as illustrated in FIG. 10, first, the cache management unit 130 specifies a cache entry for which the area reservation request has been received from entry specifying information, such as an ID, which is included in the area reservation request. Then, the cache management unit 130 evaluates the possibility of the cache data of the cache entry being cached in the cache memory 140, in terms of both the constraints and the available capacity in the cache memory 140, on the basis of information regarding the cache entry and the like (S90). As described above, the constraints may be conditions specifying an object that is not suitable for caching in terms of the complexity, the size, the shape, and the like of the object or specifying an object for which caching is clearly less efficient. The above determination may be performed using information regarding the specified cache entry which is registered in the entry management table 132, such as the size of the cache data or the object attribute (such as the kind of the object or the complexity of the object). Alternatively, the above information such as the size of the cache data or the object attribute may be received together with the area reservation request from the RIP unit 120 and may be registered in the entry management table 132.

As a result of the evaluation in S90, if it is determined that the constraints are not removed (that is, the object is not suitable for caching) (NO in S92), the cache management unit 130 changes the stage of the specified cache entry (hereinafter referred to as the "target entry") to 5, i.e., "Never Cache" (S94), and returns a response of a code indicating the failure of area reservation to the requesting RIP unit 120 (S96). In accordance with the response, as illustrated in S38 in FIG. 5, the RIP unit 120 generates a bitmap image using the PDL data of the object, and combines the bitmap image with the image of the page. Then, the process ends without caching the bitmap image.

As a result of the evaluation in S90, if it is determined that the constraints are removed (YES in S92), the cache management unit 130 further determines whether or not the capacity of the available area in the cache memory 140 (the area where no cache data is stored) is sufficient to store the cache data of the object (S98). This determination may be performed by referring to the information of the size of the cache data. If it is determined in the determination processing that the capacity of the available area is sufficient, the cache management unit 130 reserves the area corresponding to the size of the cache data within the available area in the cache memory 140, and returns a response of a code indicating the success of area reservation and also returns the address of the reserved area to the requesting RIP unit 120 (S100). In accordance with the response, the RIP unit 120 executes the processing of S32 to S36 in FIG. 5. In this case, the cache management unit 130 may register the address (for example, the start address) of the reserved area in the "address of cache area" of the entry in the entry management table 132.

If it is determined in S98 that the capacity of the available area is not sufficient, the cache management unit 130 obtains the score of the target entry from the entry management table 132 (S102), and further extracts all the cache entries (hereinafter referred to as "subordinate entries") at stage 3, i.e., "Cached", and with scores lower than the target entry from among the cache entries registered in the entry management table 132 (S104).

As described above, the score of a cache entry is an evaluation value representing the value (or effect) of caching the cache data of the cache entry in the cache memory 140. Therefore, the subordinate entries may be cache entries that are relatively less worth caching than the target entry. In the first exemplary embodiment, if the cache memory 140 has no available area sufficient to accommodate the cache data of the target entry, the cache data of the subordinate entries is evicted (or deleted) from the cache memory 140 in order to make a sufficient available capacity.

In S106, it is determined whether at least one subordinate entry is found or not in S104. If no subordinate entry is found, it is determined that the target entry satisfies the constraints that are minimum conditions defining an item to be cached (in other words, absolute conditions) but is relatively less worth caching than any other entry whose data has been cached in the cache memory 140. Therefore, in such a case, the data of the target entry is not cached. That is, if NO is determined in S106, the cache management unit 130 changes the stage of the target entry from the current stage 1, i.e., "New Cache", to stage 4, i.e., "Cached Out" (S108), and returns a response of a code indicating the failure of area reservation to the requesting RIP unit 120 (S110). In accordance with the response, as illustrated in S38 in FIG. 5, the RIP unit 120 generates a bitmap image using the PDL data of the object and combines the bitmap image with an image of the page. Then, the process ends without caching the bitmap image.

Figure 11:
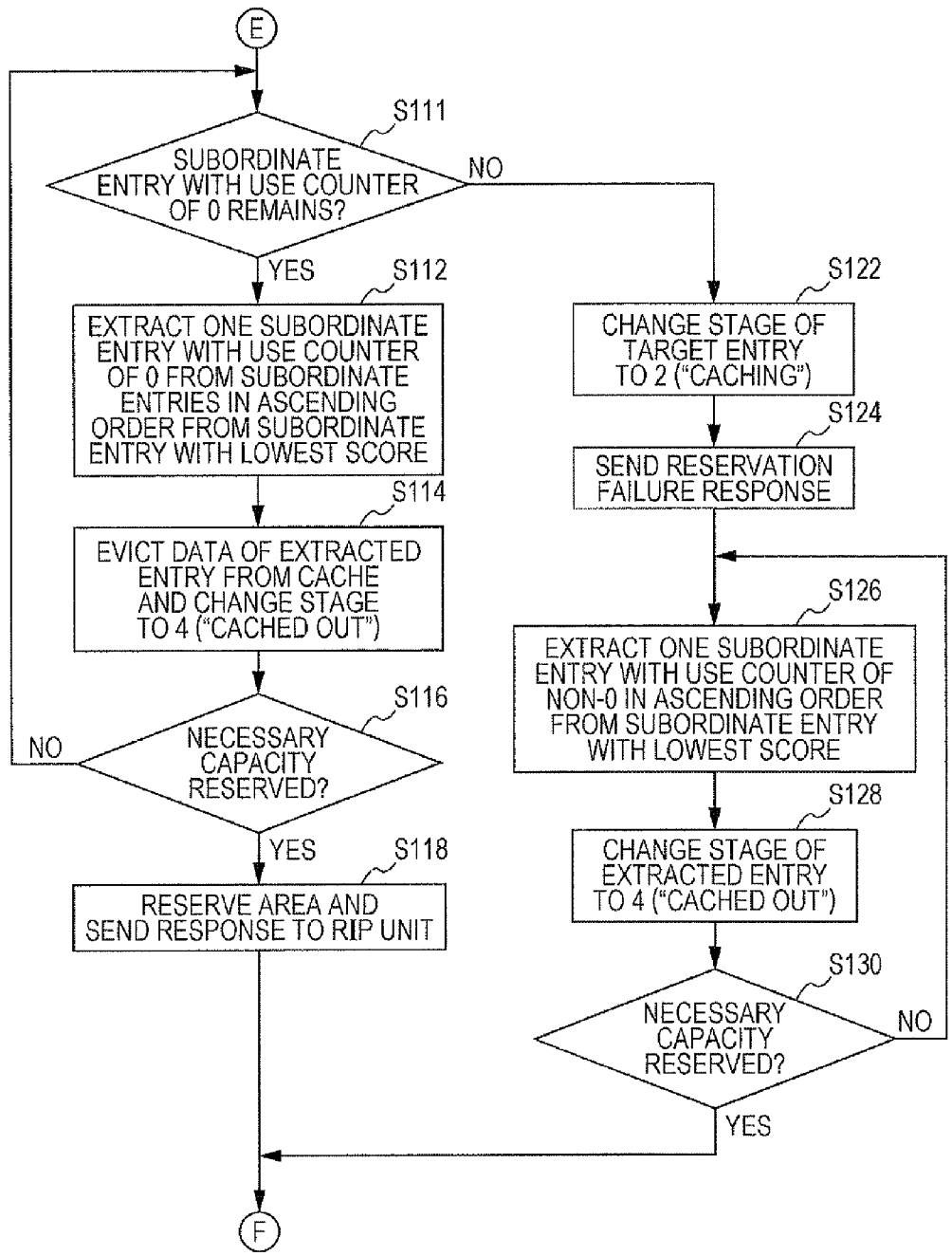
FIG. 11 is a flowchart illustrating the rest of the example of the processing procedure of the cache management unit upon receipt of an area reservation request from a RIP unit.

If it is determined in S106 that at least one subordinate entry is found (YES is determined), the cache management unit 130 executes a procedure illustrated by way of example in FIG. 11.

That is, first, it is determined whether or not the found subordinate entries include a subordinate entry with a use counter of 0 (S111). A subordinate entry with a use counter of 0 may be a cache entry (subordinate entry) whose cache data is not currently being used by any of the RIP units 120. Thus, the deletion of the cache data may have no adverse effect on the other RIP units. Therefore, if subordinate entries with a use counter of 0 are found, one of them having the lowest score is extracted (S112). Then, the address and size of the cache data of the extracted subordinate entry are determined from the entry management table 132, and the cache data is evicted (or deleted) from the cache memory 140 from the corresponding address. Then, the stage of the subordinate entry is changed from the current stage 3, i.e., "Cached", to stage 4, i.e., "Cached Out" (S114). With the eviction, the area occupied by the cache data in the cache memory 140 is freed up. The cache management unit 130 adds the freed up area to the available area, and determines whether or not the thus increasing capacity of the available area (that is, the available capacity in the cache memory 140) is sufficiently large to accommodate the cache data of the target entry (S116). If it is determined in the determination processing that the available area has not reached the necessary capacity, the cache management unit 130 returns to S111. As long as any subordinate entry with a use counter of 0 remains, the cache management unit 130 evicts the cache data of the subordinate entries and also changes the stages of the subordinate entries in ascending order from the subordinate entry having the lowest score one by one (S112, S114).

Accordingly, when the available capacity necessary to cache the target entry is successfully reserved by evicting only a subordinate entry with a use counter of 0 (YES in S116), the cache management unit 130 reserves an area corresponding to the size of the cache data from the available area in the cache memory 140, and returns a response of a code indicating the success of area reservation and also the address of the reserved area to the requesting RIP unit 120 (S118). Thus, the process of the cache management unit 130 for the area reservation request ends. In accordance with the response, the RIP unit 120 executes the processing of S32 to S36 in FIG. 5. In this case, the cache management unit 130 may register the address of the reserved area in the "address of cache area" column for the target entry in the entry management table 132.

If the available capacity necessary to cache the target entry is not successfully reserved even if all the subordinate entries with a use counter of 0 are evicted from the cache memory 140, NO is determined in S116. This determination means that the cache data of the target entry is not cached until the cache data currently being used by any of the RIP units 120 has been evicted. In this case, in the first exemplary embodiment, for example, in order to avoid any potential adverse effect on the process of the RIP unit 120 currently using the cache data of a subordinate entry, the cache management unit 130 abandons the caching of the cache data of the target entry currently requested. However, since the target entry is more worth caching (has a higher score) than the subordinate entry currently being used, the cache management unit 130 does not leave the target entry in the state where the caching of the cache data is abandoned but makes preparations for caching.

That is, in the procedure illustrated in FIG. 11, if NO is determined in S111, the stage of the target entry is changed from the current stage 1, i.e., "New Cache", to stage 2, i.e., "Caching" (S122). As described above, stage 2, "Caching", represents a "waiting" state where although the entry is more worth caching than any other entry, an area sufficient to cache the cache data of the entry is not reserved until the cache data of the subordinate entry currently being used has been evicted. Then, the cache management unit 130 returns a response of a code indicating the failure of area reservation to the requesting RIP unit 120 (S124). In accordance with response, as illustrated in S38 in FIG. 5, the RIP unit 120 performs RIP processing on the PDL data of the object to generate a bitmap image, and combines the bitmap image with the image of the page. Then, the process ends without caching the RIP processing result.

The above case is substantially the same as the case where the target entry interferes with the constraints (S92 to S94 in FIG. 10) or the case where no subordinate entry is found (S106 to S110 in FIG. 10) because the generated RIP processing result is not cached. However, in such cases, the target entry is absolutely little worth caching or is relatively less worth caching than any other entry, and is controlled so that the cache data of the target entry is not cached or registered for a long time yet or for a while by changing the stage of the target entry to "Never Cache" or "Cached Out". In contrast, in this case, i.e., in a case where NO is determined in S111, the target entry is relatively sufficiently much worth caching, and the target entry is specially set at the "Caching" stage. If a query on the same target entry is sent from any of the RIP units 120 later, the caching and registration of the cache data of the target entry are attempted again.

The cache management unit 130 further extracts subordinate entries with a use counter of non-0 one by one in ascending order from the subordinate entry with the lowest score (S126), and changes the stage of the extracted subordinate entry from stage 3, i.e., "Cached", to stage 4, i.e., "Cached Out" (S128).

Then, the cache management unit 130 computes the available capacity in the cache memory 140 assuming that the cache data of the subordinate entries whose state has been changed to "Cached Out" have been evicted, and repeats the processing of S126 and S128 until the available capacity has reached the amount sufficient to cache the cache data of the target entry (S130). At the time when the necessary available capacity is reserved, the cache management unit 130 ends the process on the area reservation request.

In S114, as described above, the cache data of the extracted subordinate entry is evicted from the cache memory 140, whereas in S128, the cache data of the extracted subordinate entry is still being used by another RIP unit 120 and therefore is not evicted at this time. However, since the stage of the extracted subordinate entry has been changed to 4, i.e., "Cached Out", the cache data is evicted from the cache memory 140 after the cache data is no longer used by any of the RIP units 120 (the details of which will be described below). The processing of S128 may be regarded as making an eviction reservation for the subordinate entry currently being used. In this manner, making an eviction reservation for an entry (subordinate entry) having a lower score than the target entry may increase the possibility of, for example, the cache data of the target entry being cached in the next opportunity.

Further, after the transition of the subordinate entry currently being used to stage 4, i.e., "Cached Out", when a query on the subordinate entry is sent from any of the RIP units 120 later, the cache management unit 130 returns a "Deleted" response (S70 in FIG. 7). In this case, the querying RIP unit 120 performs RIP processing on the PDL data without using the cache data (S24 in FIG. 4). That is, the subordinate entry is currently being used. Thus, in the first exemplary embodiment, the querying RIP unit 120 is not allowed to use the cache data of the subordinate entry although the cache data is still in the cache memory 140. In such a case, if the querying RIP unit 120 is permitted to use the cache data, the entry under the eviction reservation may not possibly be evicted for long time under the basic principle that cache data being used by any of the RIP units 120 is not evicted. By contrast, in the first exemplary embodiment, the use of a subordinate entry reserved for eviction is not permitted, and therefore the above inconvenience may be avoided.

Either the processing of S122 and S124 or the processing of S126 to S130 may be executed earlier.

Furthermore, although not illustrated in FIG. 11 to avoid the increase in complexity, even if the stage of all the subordinate entries with a use counter of non-0 is changed to stage 4, i.e., "Cached Out", the capacity sufficient to cache the cache data of the target entry may not necessarily be reserved. In this case, the cache management unit 130 may terminate the process on the area reservation request. Here, if the necessary area is not successfully reserved, no problem occurs because a response indicating the failure of reservation has been returned in response to the current area reservation request. In addition, for any future query on the same target entry, because of the subordinate entries having been reserved for eviction, the possibly that the caching and registration will be successful may increase.

Next, an example of the processing procedure of the cache management unit 130 upon receipt of a cache data registration request from any of the RIP units 120 will be described with reference to FIG. 12.

Figure 12:
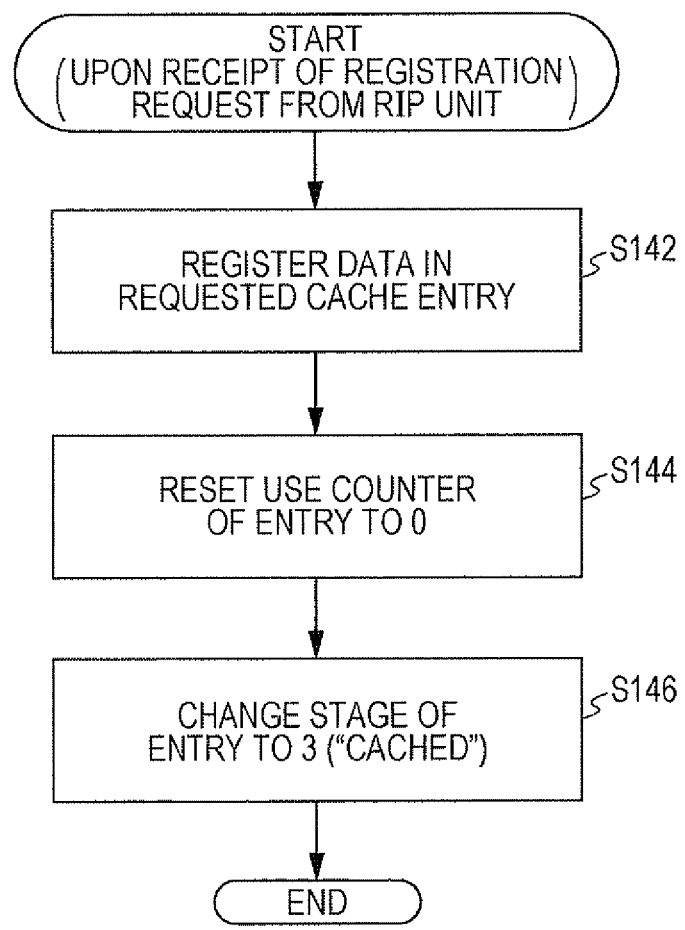
FIG. 12 is a flowchart illustrating an example of a processing procedure of the cache management unit upon receipt of a registration request from a RIP unit.

In this procedure, as illustrated in FIG. 12, first, the cache management unit 130 specifies the requested cache entry from entry specifying information included in the registration request, such as an ID, and registers the cache data in the cache entry (S142). For example, the entry management table 132 may have an item (not illustrated in FIG. 2) indicating whether the cache data has been registered or not, and the value of the item may be changed from "not registered" to "registered" in S142.

The cache management unit 130 further resets the value of the use counter of the cache entry to 0 (S144), and also makes the entry transition from stage 1, i.e., "New Cache", to stage 3, i.e., "Cached" (S146). At this time, the "RIP currently creating data" item for the entry is cleared.

The processing procedures of the cache management unit 130 in response to various access events (such as a query, a use start request, a use end notification, an area reservation request, and a registration request) from the RIP units 120 have been described by way of example. In the processing procedure described above, one or more RIP units 120 may make an eviction reservation for a cache entry currently being used (the cache data is not deleted but the stage is changed to 4, i.e., "Cached Out"). In the first exemplary embodiment, for a cache entry reserved for eviction, the cache data is actually evicted as quickly as possible at the time when the cache data is no longer used by any of the RIP units 120, and the area occupied by the data is freed up. There may be several conceivable methods for freeing up an area for a cache entry reserved for eviction.

Figure 13:
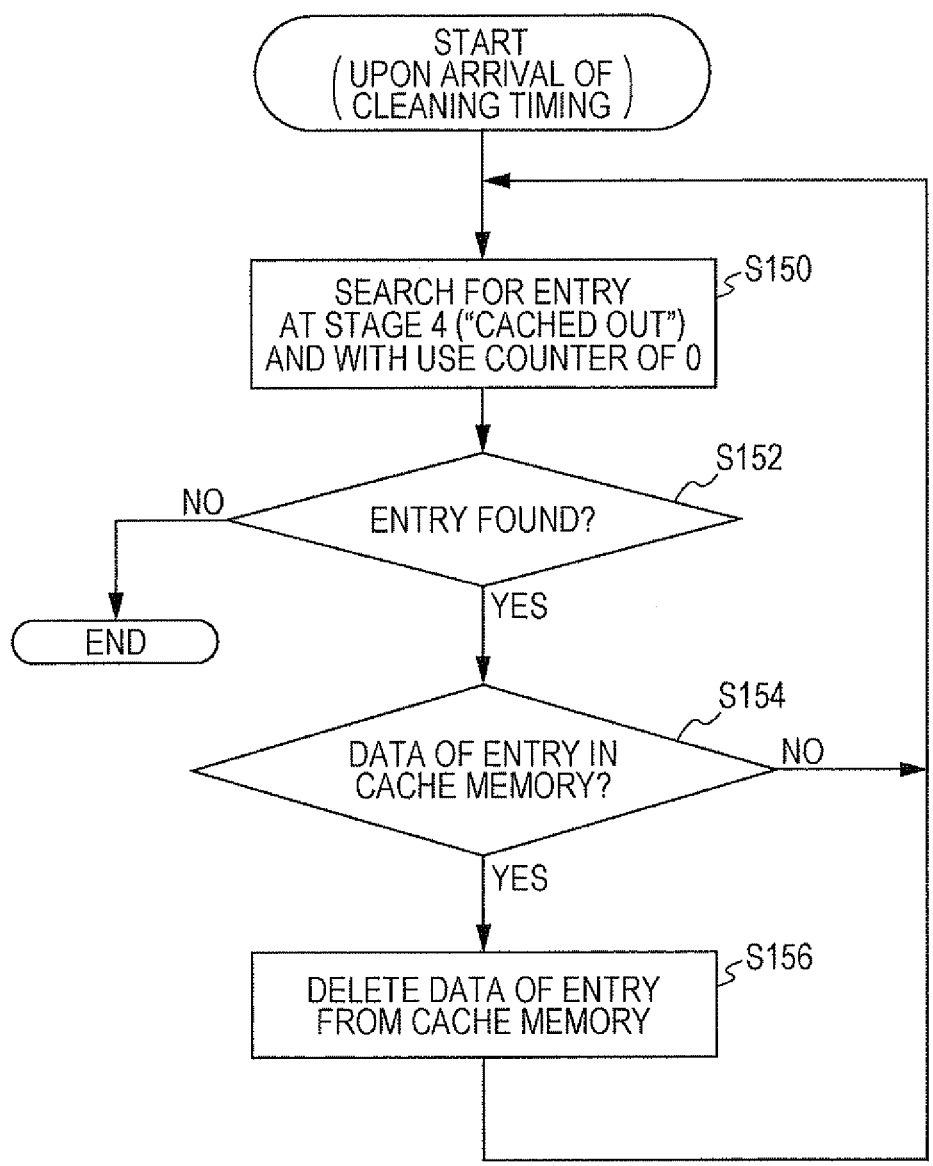
FIG. 13 is a flowchart illustrating an example of a process for evicting cache data of a cache entry reserved for eviction.

One of the conceivable methods is to periodically check the entry management table 132 and search for a cache entry for which the area is to be freed up. FIG. 13 illustrates an example of the procedure according to this method.

In the procedure illustrated in FIG. 13, upon arrival of the periodic timing of check (called the "cleaning timing"), the cache management unit 130 searches the entry management table 132 for an entry at stage 4, i.e., "Cached Out", and with a use counter of 0 (S150). If such an entry is found (YES in S152), it is determined whether the cache data of the entry is still in the cache memory 140 or not (S154). If YES is determined in S154, the cache data is evicted from the cache memory 140, and the area occupied by the data is freed up (S156). Then, the process returns to S150. If NO is determined in S154, the process skips S156 and returns to S150. In this manner, the cache data of all the cache entries at stage 4, i.e., "Cached Out", and with a use counter of 0 is evicted.

Figure 14:
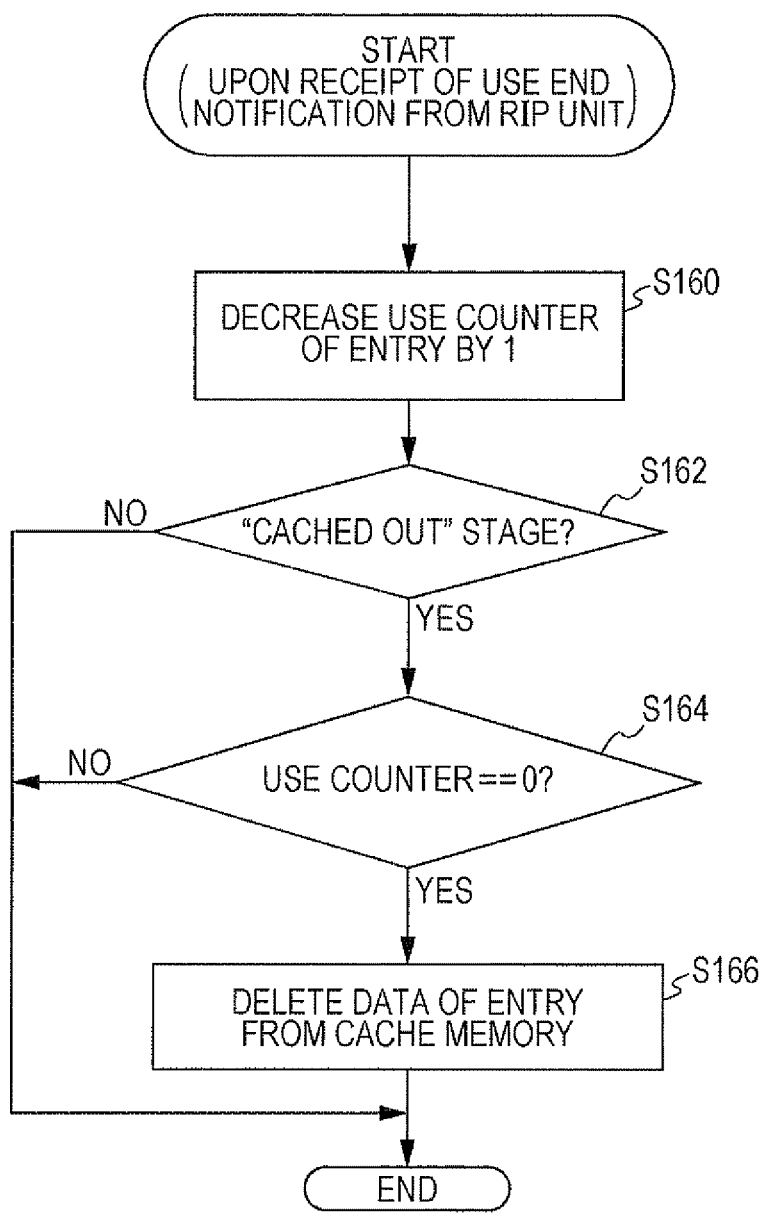
FIG. 14 is a flowchart illustrating an example of the eviction of cache data of a cache entry reserved for eviction in a process corresponding to a use end notification.

The freeing up of an area for a cache entry reserved for eviction may also be performed during the process on a use end notification of cache data. FIG. 14 illustrates an example of the procedure according to this method.

The procedure illustrated in FIG. 14 may be executed when a use end notification of cache data arrives from any of the RIP units 120. In this procedure, the cache management unit 130 specifies a cache entry corresponding to an ID or the like included in the use end notification from the entry management table 132, and decreases the value of the use counter of the entry by 1 (S160). Then, it is determined whether the stage of the entry is 4, i.e., "Cached Out", or not (S162), and it is also determined whether the value of the use counter is 0 or not (S164). If the both determination results are YES, the cache data of the entry is evicted from the cache memory 140 (S166). Therefore, the area occupied by the cache data is freed up. If the specified entry is not at stage 4 or if the value of the use counter of the entry is not 0, the process ends without deleting the cache data. Through this procedure, the cache data of a cache entry reserved for eviction is evicted immediately after the cache data is no longer used by any of the RIP units 120.

Figure 15:
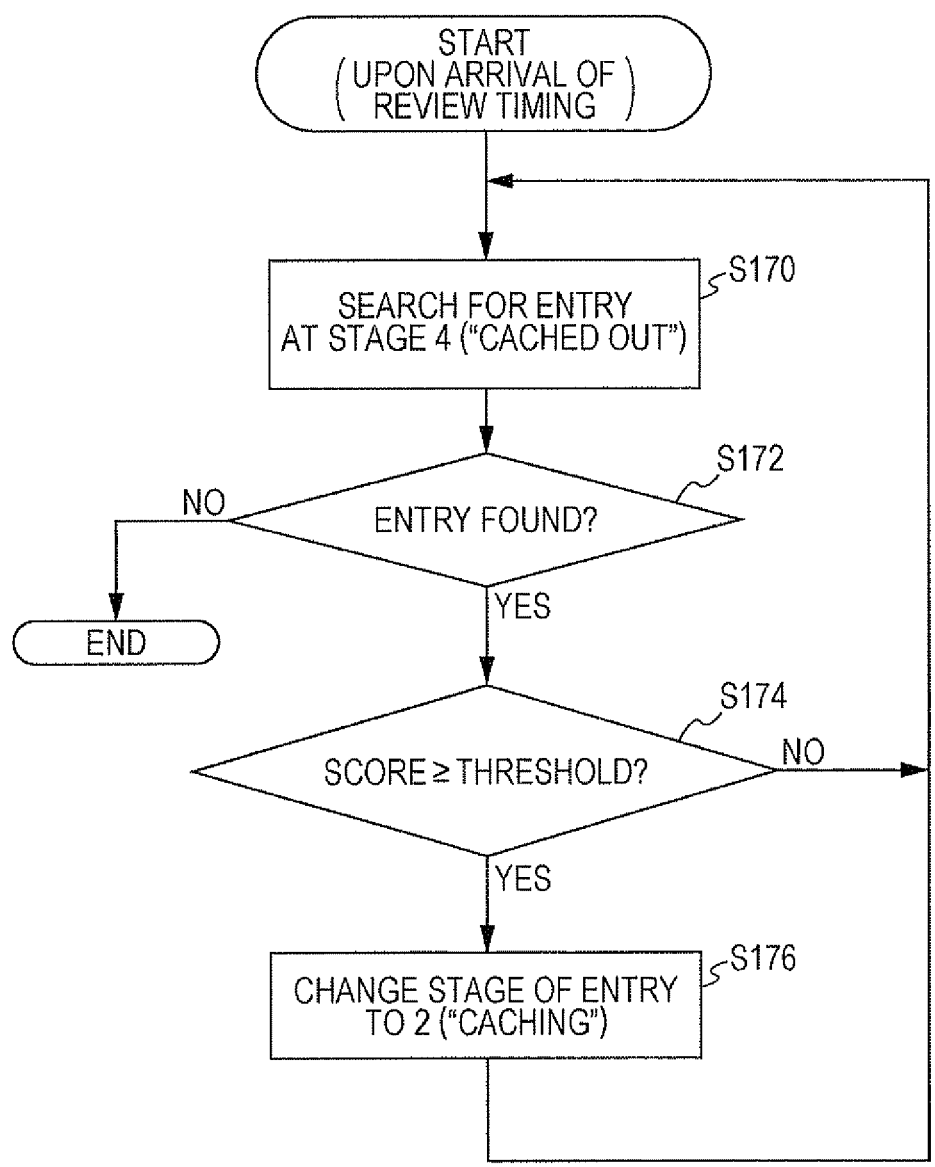
FIG. 15 is a flowchart illustrating an example of a procedure of a process for reviewing an evicted cache entry.

Next, an example of the process for reviewing a cache entry made to transition to the "Cached Out" stage will be described with reference to FIG. 15. For example, the process may be executed each time the timing of review that is determined in accordance with a predetermined rule arrives, for example, each time a certain period arrives.

In this procedure, upon arrival of the timing of review, the cache management unit 130 searches the entry management table 132 for a cache entry at stage 4, i.e., "Cached Out" (that is, a cache entry that has been evicted) (S170). If such an entry is found (YES in S172), it is determined whether or not the score of the entry is greater than or equal to a predetermined threshold (S174). If the score of the cache entry is a value normalized so as to be within a certain range, the threshold used for this determination may be a fixed value. Otherwise, the threshold is adaptively changed in accordance with the distribution of the scores of the cache entries registered in the entry management table 132. Various methods may be conceivable for determining a threshold. For example, the average value of the scores of all the cache entries may be used as the threshold, or the score on a predetermined place in the list of scores of all the cache entries, from the top, may be used as the threshold. The threshold may also be determined based on the lowest score among the scores of the cache entries currently at stage 3, i.e., "Cached" (for example, a value obtained by adding a predetermined value to the lowest score may be used as the threshold).

If it is determined in S174 that the score of the cache entry is greater than or equal to the threshold, this means that the cache data of the cache entry is worth returning to the cache memory 140. In this case, the cache management unit 130 makes the cache entry transition from stage 4, i.e., "Cached Out", to stage 2, i.e., "Caching" (S176). Thus, when a query on the cache entry arrives from any of the RIP units 120 later, the entry transitions to stage 1, i.e., "New Cache", and the RIP unit 120 attempts to register the cache data of the entry (see S66 in FIG. 7 and also see FIGS. 4 and 5).

First Modification

In the first exemplary embodiment described above, if the cache data of a certain cache entry is currently being created (that is, stage 1, i.e., "New Cache"), a RIP unit 120 that has sent a query on the entry determines whether or not to wait for the completion of the creation of the cache data (see S42 and S43 in FIG. 6). The determination may be performed by the cache management unit 130 that has received the query. An example of the determination performed by the cache management unit 130 will be described hereinafter.

Figure 16:
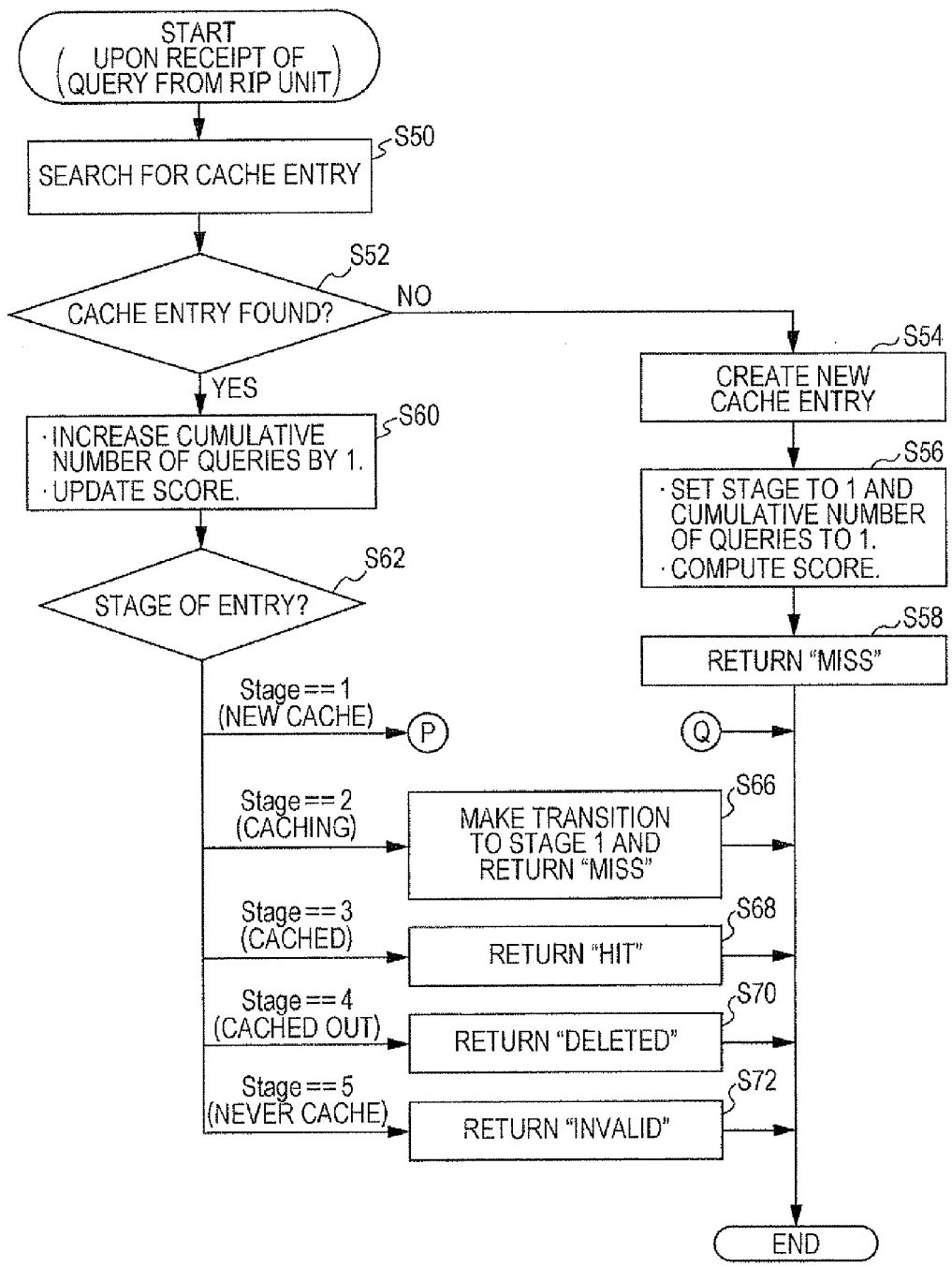
FIG. 16 is a flowchart illustrating a portion of a processing procedure according to a first modification of the first exemplary embodiment in which the cache management unit determines whether or not to cause a RIP unit to wait for the completion of the creation of cache data according to the first exemplary embodiment.
Figure 17:
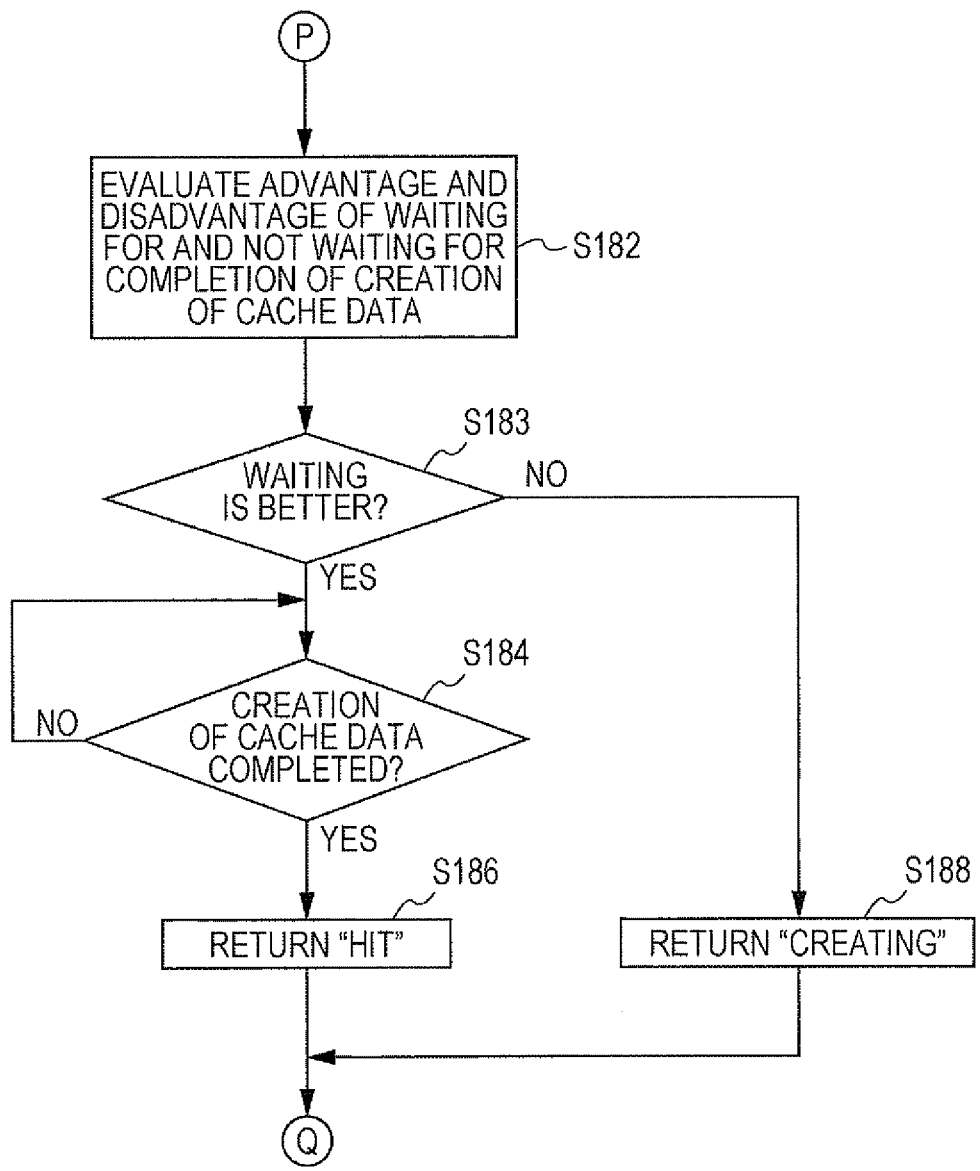
FIG. 17 is a flowchart illustrating the rest of the processing procedure according to the first modification of the first exemplary embodiment in which the cache management unit determines whether or not to cause a RIP unit to wait for the completion of the creation of cache data according to the first exemplary embodiment.

FIGS. 16 and 17 illustrate the processing procedure of the cache management unit 130 upon receipt of a query on a cache entry from a RIP unit 120 in this example. The procedure illustrated in FIG. 16 may be substantially the same as the procedure illustrated in FIG. 7, except for the processing performed when the queried cache entry is at stage 1, i.e., "New Cache".

If the queried cache entry is at stage 1, i.e., "New Cache", the cache management unit 130 executes the procedure illustrated by way of example in FIG. 17. In this procedure, the cache management unit 130 evaluates the effects of an operation for allowing the querying RIP unit 120 (called the first RIP unit) to perform RIP processing on PDL data of the object and an operation of allowing the first RIP unit to use the cache data of the object after another RIP unit 120 (called the second RIP unit) currently creating the cache data of the object has completed the creation of the cache data. That is, the cache management unit 130 determines which operation is used to speed up the completion of the processing (S182). The evaluation may be performed using a method similar to that in S42 in FIG. 6.

In S183, it is determined based on the result of evaluation in S182 whether or not waiting for the completion of the creation of the cache data currently being created is better or not. If it is determined in S183 that it is better that the first RIP unit waits for the completion of the creation of the cache data, the cache management unit 130 waits for a request for registering the cache data to arrive from the second RIP unit (S184). The arrival of a registration request notifies the cache management unit 130 of the completion of the creation of the cache data. Then, the cache management unit 130 returns a "Hit" response to the first RIP unit (S186). Since the cache data is in the cache memory 140 at this time, the first RIP unit that has received the "Hit" response advances the RIP processing of the page using the cache data.

That is, in this example, if it is determined that waiting is better, the cache management unit 130 does not immediately return a response to the querying RIP unit 120 (first RIP unit), but returns a "Hit" response after the creation of the cache data has been completed. During this operation, the querying RIP unit 120 waits for a response to be received from the cache management unit 130. However, the above process is merely an example. Alternatively, the cache management unit 130 may explicitly instruct the querying RIP unit 120 to wait for the completion of the creation of the cache data immediately when it is determined that waiting is better, and thereafter return a "Hit" response when the creation of the cache data is completed.

If it is determined in S183 that not waiting is better (that is, the operation for allowing the first RIP unit to perform RIP processing on PDL data is used to speed up the completion), the cache management unit 130 immediately returns a "Creating" response to the first RIP unit (S188). Upon receipt of the "Creating" response, the first RIP unit performs RIP processing on the PDL data of the object without waiting for the completion of the creation of the cache data, and advances the drawing on the page. In this case, the RIP processing result is not cached.

Second Modification

Figure 18:
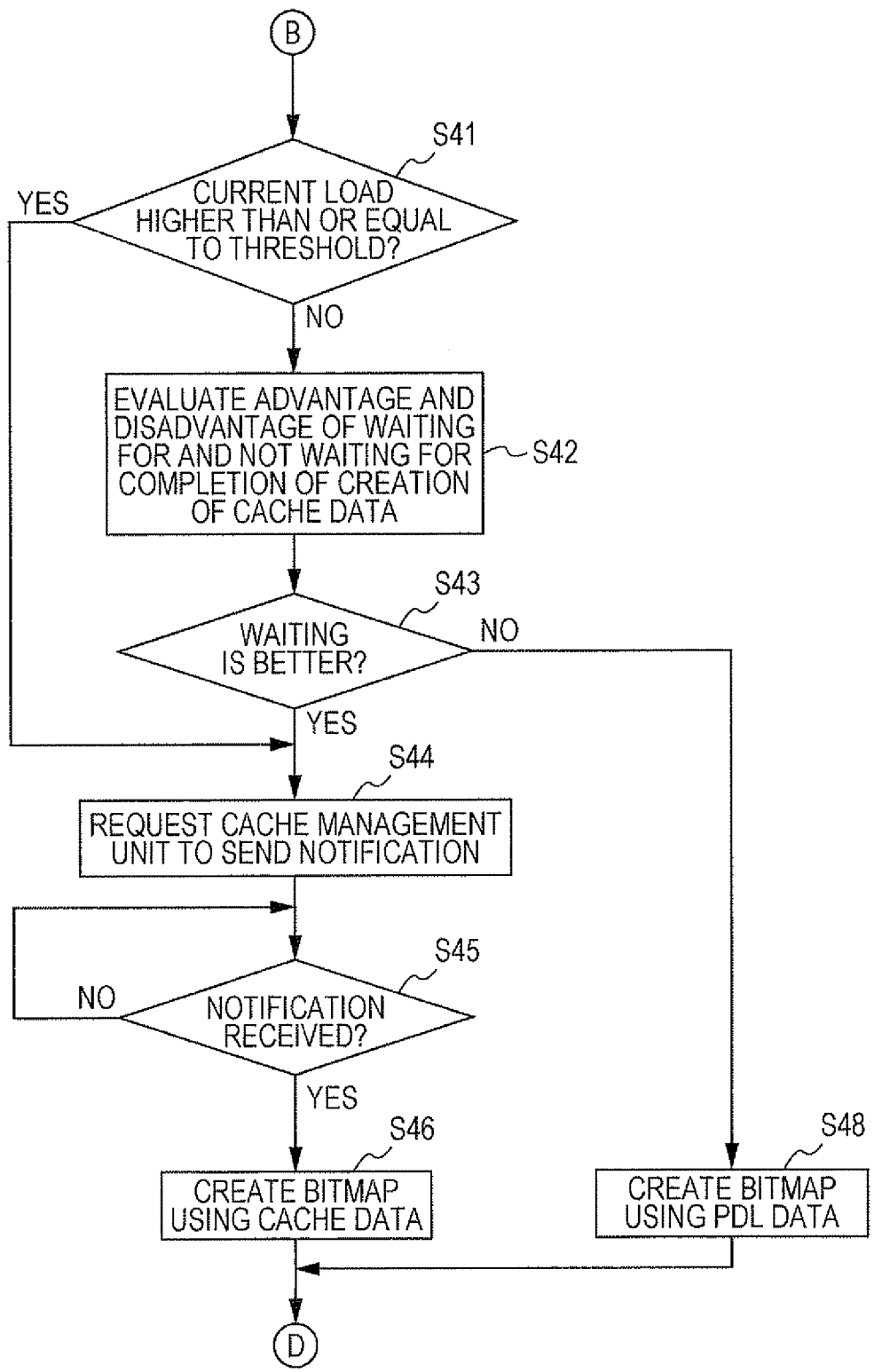
FIG. 18 is a flowchart illustrating a substantial part of a processing procedure according to a second modification of the first exemplary embodiment in which a RIP unit skips the determination as to whether or not to wait for the completion of the creation of cache data in accordance with the load on the RIP unit according to the first exemplary embodiment.

Another modification may also be conceivable. In the first exemplary embodiment described above, if the cache data of a certain cache entry is currently being created, a RIP unit 120 that has sent a query on the entry determines whether or not to wait for the completion of the creation of the cache data (see S42 and S43 in FIG. 6). In this modification, in contrast, if the processing load on the RIP unit 120 is high, the determination itself is not performed. An example of the procedure according to this modification is illustrated in FIG. 18. FIG. 18 illustrates a flow of a process performed after it is determined in S16 in the procedure illustrated in FIG. 4 that the response is "Creating".

In this modification, in this case, first, the RIP unit 120 determines whether or not the load on the RIP unit 120 is greater than or equal to a predetermined threshold (S41). The term "load" used here is substantially the same as the load on the RIP unit 120 that is being monitored by the load monitoring unit 114. If the load is greater than the threshold, the execution of the processing of S42 and S43, which is similar to that in the procedure illustrated in FIG. 6, may place a non-negligible load on the RIP unit 120 (that is, may obstruct other processing currently being executed). In other words, the threshold may represent the lower limit load that may cause the above situation, and may be determined in advance from an experiment or the like.

If it is determined in S41 that the load on the RIP unit 120 is greater than or equal to the threshold, the process skips S42 and S43 and it is automatically determined that the RIP unit 120 waits for the completion of the creation of the cache data. Then, the process proceeds to S44. That is, in this case, because a high load will be placed on the RIP unit 120, the RIP unit 120 does not perform RIP processing on the PDL data. The other steps may be similar to those in FIG. 6.

Third Modification

In the first exemplary embodiment described above, furthermore, a RIP unit 120 that has received a "Creating" response from the cache management unit 130 determines whether or not to wait for the completion of the creation of cache data currently being created. Alternatively, upon receipt of "Creating", the RIP unit 120 may always wait for the completion of the creation of the cache data currently being created without performing the above determination. Conversely, the RIP unit 120 may always perform RIP processing without waiting for the completion of the creation of the cache data, and may not cache the processing result. Even in this case, upon receipt of a "Creating" response indicating that cache data is currently being created, which is not used in the related art, the RIP unit 120 may take an action different from that upon receipt of an existing "Miss" or "Hit" response. Only "Miss" and "Hit" responses would not enable a RIP unit 120 that has received a "Miss" response to know if the desired cache data is currently being created. Such ignorance may prevent the RIP unit 120 from waiting for the completion of the creation of the cache data, and may cause the processing result obtained by performing RIP processing on PDL data by the RIP unit 120 to be registered in the cache memory 140 redundantly.

Second Exemplary Embodiment

Overview

A second exemplary embodiment of the present invention will now be described. In the second exemplary embodiment, the process of the cache management unit 130 in response to an area reservation request from a RIP unit 120 in the configuration and process of the first exemplary embodiment is modified. In the second exemplary embodiment, the same configuration and process as those in the first exemplary embodiment, except for a configuration and process explicitly different from those in the first exemplary embodiment, will be used. A print document conversion system according to the second exemplary embodiment may have a configuration illustrated in FIG. 1. For example, the entry management table 132 may have a data structure similar to that in the first exemplary embodiment illustrated by way of example in FIG. 2. The state transitions of a cache entry may also be similar to the state transitions in the first exemplary embodiment illustrated by way of example in FIG. 3.

In the first exemplary embodiment described above, in the area reservation processing in response to an area reservation request, if a necessary available capacity is not reserved even though the cache data of all the subordinate entries at stage 3, i.e., "Cached", and with a use counter of 0 is evicted, the reservation of the area is abandoned at this time, and a response indicating the failure of area reservation is returned to the requesting RIP unit 120 (for example, S124 in FIG. 11).

In the second exemplary embodiment, in contrast, in this case, if a subordinate entry at stage 3 and with a use counter of non-0 (that is, whose cache data is currently being used by any of the RIP units 120) exists, the cache data of such a subordinate entry is evicted (or deleted) to reserve an area.

Figure 5:
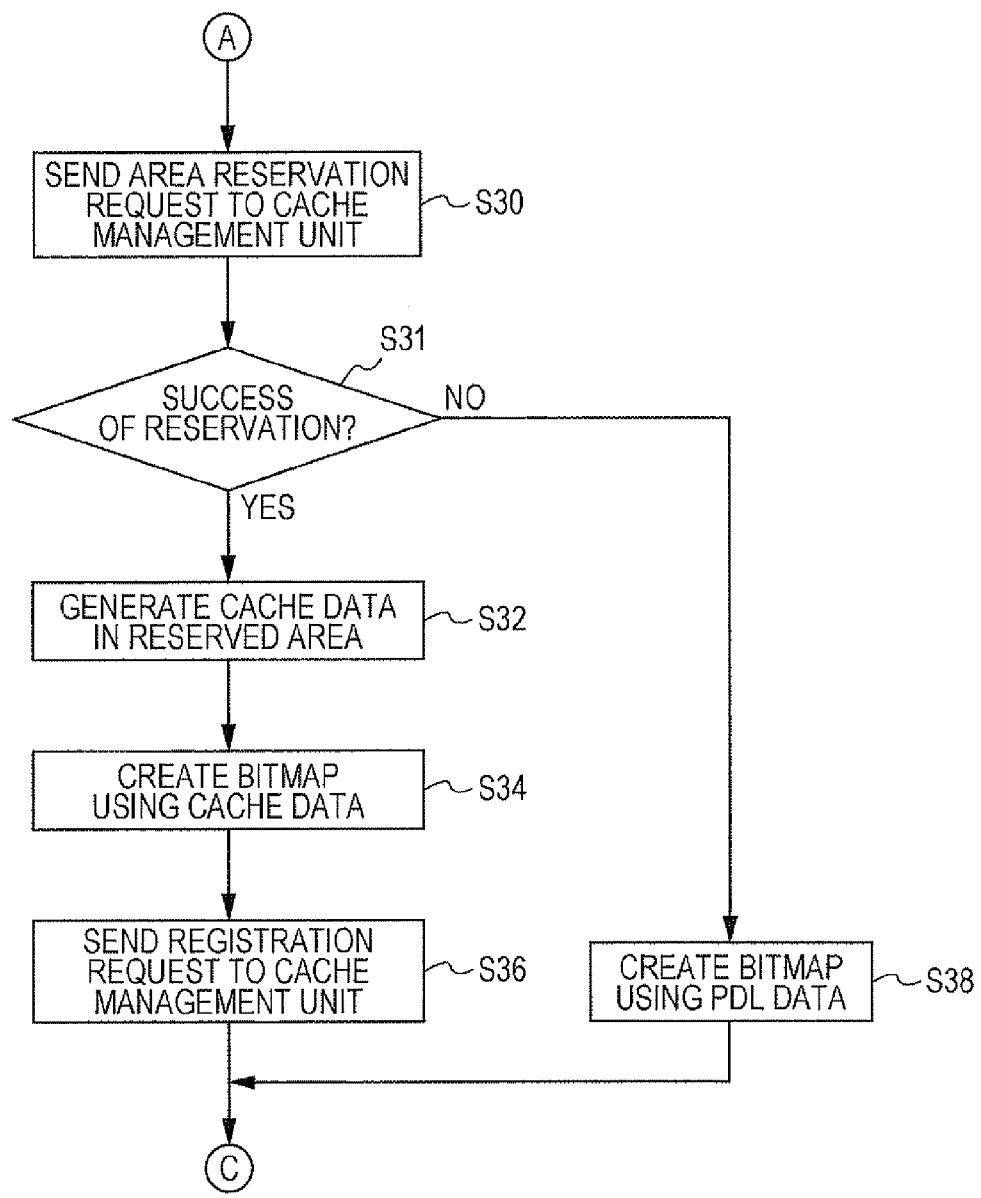
FIG. 5 is a flowchart illustrating an example of a processing procedure of a RIP unit upon receipt of a "Miss" response from a cache management unit.

The processing procedure of each of the RIP units 120 in the second exemplary embodiment may be similar to that in the first exemplary embodiment (see FIGS. 4 to 6).

Figure 7:
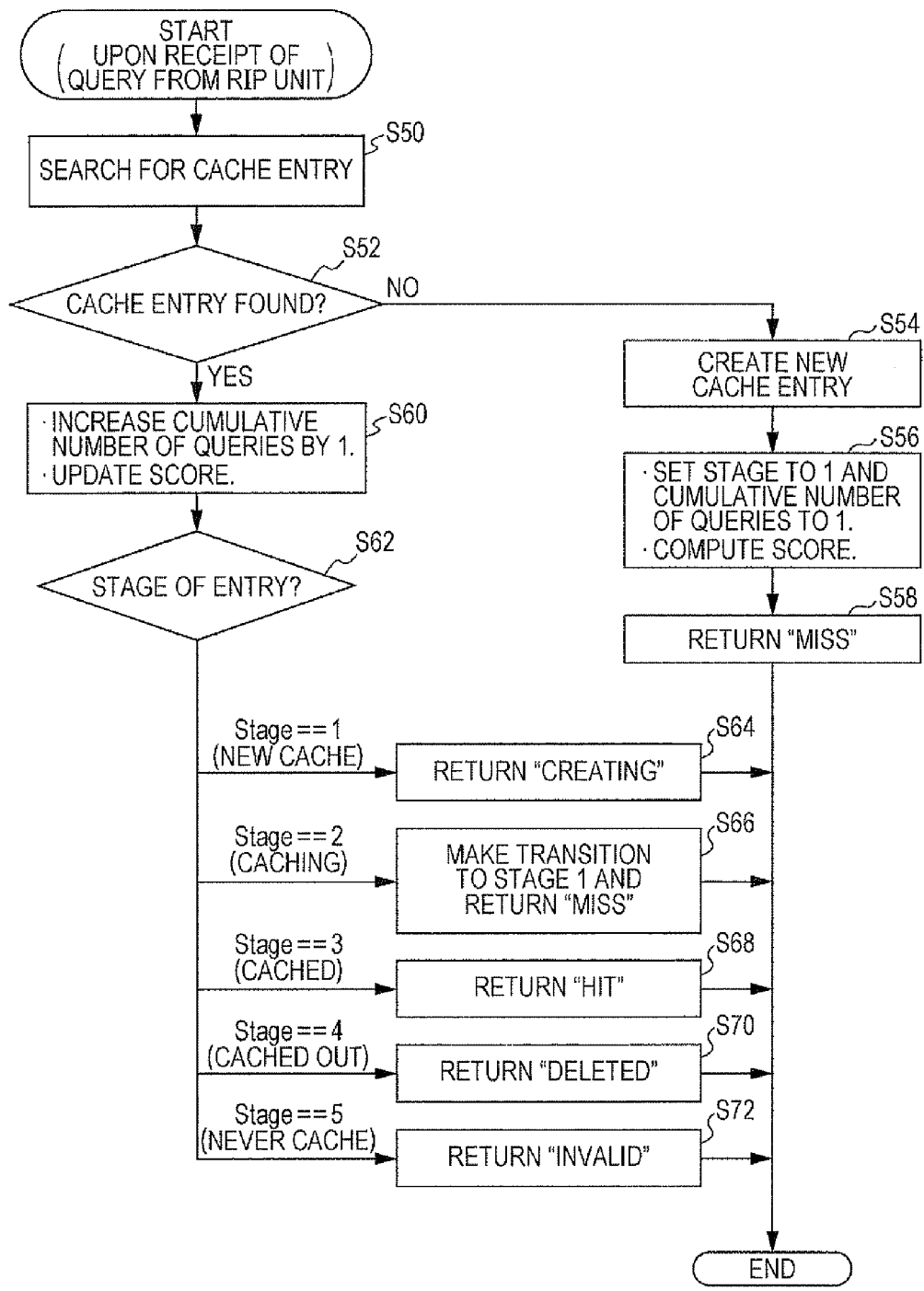
FIG. 7 is a flowchart illustrating an example of a processing procedure of the cache management unit upon receipt of a query from a RIP unit.

In the operation of the cache management unit 130 according to the second exemplary embodiment, the processing procedure of the cache management unit 130 upon receipt of a query from any of the RIP units 120 may be similar to that in the first exemplary embodiment (see FIG. 7). Further, the processing procedure of the cache management unit 130 upon receipt of a use start request from any of the RIP units 120 may also be similar to that in the first exemplary embodiment (see FIG. 8). The process performed upon arrival of the cleaning timing and the process performed upon arrival of the timing of review may also be similar to those in the first exemplary embodiment (see FIGS. 13 and 15).

However, the operation of the cache management unit 130 upon receipt of an area reservation request from any of the RIP units 120 is different from that in the first exemplary embodiment (see FIGS. 10 and 11). In particular, in the area reservation processing in response to an area reservation request, a process different from that in the first exemplary embodiment may be performed if a necessary available capacity is not successfully reserved even though the cache data of all the subordinate entries at stage 3, i.e., "Cached", and with a use counter of 0 (in the first exemplary embodiment, if NO is determined in S111 in FIG. 11) is evicted.

In the area reservation processing in response to an area reservation request, three methods may be used for the process in the second exemplary embodiment performed if a necessary available capacity is not successfully reserved even though the cache data of all the subordinate entries at stage 3, i.e., "Cached", and with a use counter of 0 is evicted. Examples of the three methods of processing procedures will now be described in sequence.

First Method: Temporary Overflowing

In the first method according to the second exemplary embodiment, upon receipt of an area reservation request from any of the RIP units 120, the cache management unit 130 performs substantially the same operation as that in the procedure in the first exemplary embodiment illustrated in FIG. 10. In the procedure, if it is determined in S106 that a subordinate entry is found, in the first method, the cache management unit 130 executes a procedure illustrated in FIG. 19. In the procedure illustrated in FIG. 19, the processing of S111 to S118 and S126 to S130 is similar to that in the first exemplary embodiment illustrated in FIG. 11.

Figure 19:
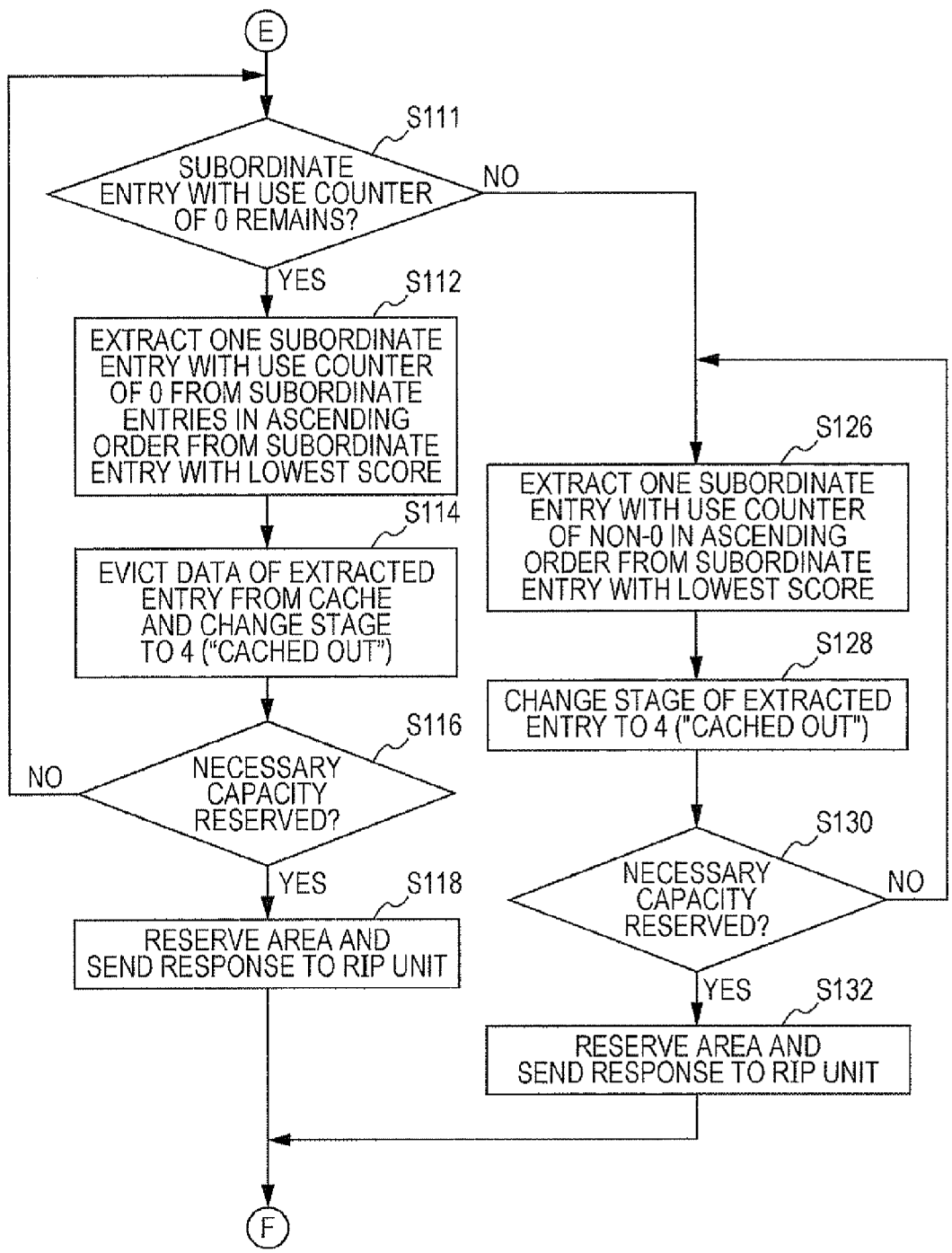
FIG. 19 is a flowchart illustrating the substantial part of a first method in an example of a processing procedure of the cache management unit upon receipt of an area reservation request from a RIP unit according to an exemplary embodiment.

The procedure illustrated in FIG. 19 is different from the procedure illustrated in FIG. 11 in that, first, if it is determined in S111 that any subordinate entry at stage 3, i.e., "Cached", and with a use counter of 0 does not remain, the processing of S122 and S124 (the target entry is made to transition to stage 2, i.e., "Caching", and a response indicating the failure of reservation is returned) is not performed. Another difference is that if it is determined in S130 that a necessary capacity is successfully reserved, the cache management unit 130 reserves an area for the target entry in the cache memory 140, and returns a code indicating the reservation of the area and information regarding the address of the reserved area to the requesting RIP unit 120 (S132).

That is, in S128, while the subordinate entries being used are only made to transition to stage 4, i.e., "Cached Out", the cache data of the subordinate entries being used is not evicted from the cache memory 140. If it is determined in S130 that a necessary available capacity has been successfully reserved in the cache memory 140, the determination is based on the assumption that the cache data of the subordinate entries being used has been evicted. Thus, at the time when the processing of S132 is executed, the available capacity in the cache memory 140 is actually smaller than the capacity necessary for the target entry. Therefore, the operation performed in S132 is to reserve an area for the target entry by estimating that the capacity of subordinate entries (subordinate entries for which eviction reservation has been made) that have not actually been evicted will be evicted in the near future upon completion of the use of the subordinate entries. Thus, in S132, the area is reserved in such a manner that the reserved area temporarily exceeds (or overflows) the limited overall capacity allocated to the cache memory 140 by the operating system. Specifically, the operating system of the computer in which the cache management unit 130 and the cache memory 140 are implemented allocates a portion of a memory space managed by the operating system to the cache memory 140. In S132, the cache area for the target entry, which is beyond the allocated area, is reserved. With the above reservation process, the size of the area actually used as the cache memory 140 exceeds the originally allocated cache memory size. The overflow is merely temporary until the creation of the cache data of the subordinate entries for which the eviction reservation has been made has been completed.

Although not illustrated in FIG. 19 to avoid the increase in complexity, even if the stage of all the subordinate entries with a use counter of non-0 is changed to stage 4, i.e., "Cached Out", the capacity sufficient to cache the target entry may not necessarily be reserved. In this case, for example, the cache management unit 130 may return the failure of reservation in response to the area reservation request.

In the first method, a RIP unit 120 that has made a request for reserving an area for the target entry is immediately allocated a cache area if it is possible to obtain a necessary capacity by freeing up areas of subordinate entries at stage 3.

In the first method, furthermore, similarly to the first exemplary embodiment, an area for a cache entry reserved for eviction in S128 may be freed up using the procedure illustrated by way of example in FIG. 13 or 14. The cache data of a subordinate entry reserved for eviction is actually evicted from the cache memory 140 using the procedure illustrated in FIG. 13 or 14. Thus, the overflow of the cache memory 140 may be addressed.

Second Method: Immediate Forced Eviction

A second method according to the second exemplary embodiment may be substantially the same as the first method described above in that an area for the target entry is immediately reserved. In the first method, while the area for the target entry is reserved so as to overflow the capacity allocated to the cache memory 140, a subordinate entry being used is not actually evicted (but is only reserved for eviction), whereas in the second method, in order to avoid overflowing, a subordinate entry being used is actually evicted and then an area for the target entry is reserved. If a subordinate entry being used is actually evicted, the RIP unit 120 currently using the cache data of the subordinate entry is prevented from continuing the RIP processing. In the second method, therefore, the RIP unit 120 currently using the cache data of the subordinate entry to be evicted is notified of the deletion of the cache data. In response to the notification, the RIP unit 120 performs RIP processing on the original PDL data of the object corresponding to the cache data to be deleted.

In order to implement the above processing, in the second method, for example, as illustrated by way of example in FIG. 20, the entry management table 132 records a "RIP currently using entry" column. In the "RIP currently using entry" column, identification information regarding a RIP unit 120 currently using the cache data of the cache entry (that is, for a period of time from when a use start request for the cache data is issued to when a use end notification is issued) is registered. If multiple RIP units 120 are currently using the cache data of a single cache entry, identification information regarding all the RIP units 120 currently using the cache data is registered. For a cache entry whose cache data is not in the cache memory 140 (an entry at a stage other than stage 3, i.e., "Cached"), the "RIP currently using entry" column is blank. Also for a cache entry at stage 3, i.e., "Cached", the "RIP currently using entry" column is blank for a period during which the cache data of the cache entry is not being used by any of the RIP units 120.

Figure 21:
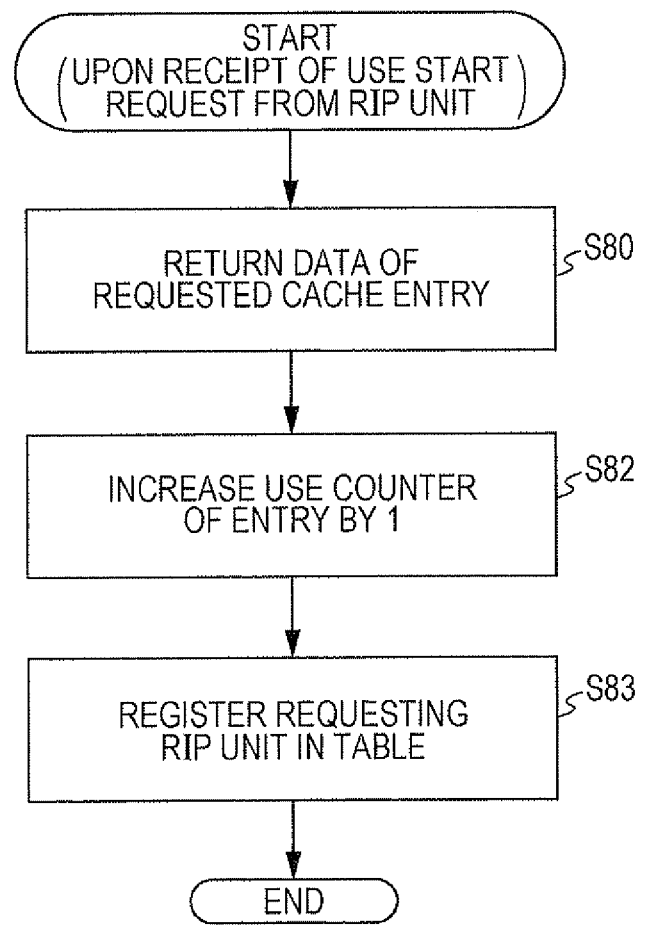
FIG. 21 is a flowchart illustrating an example of a processing procedure of the cache management unit upon receipt of a use start request in the second method according to the exemplary embodiment.
Figure 22:
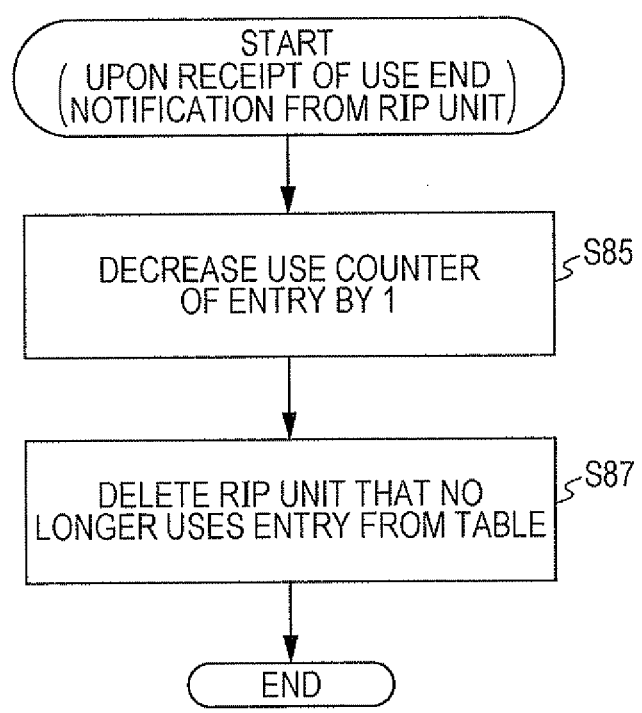
FIG. 22 is a flowchart illustrating an example of a processing procedure of the cache management unit upon receipt of a use end notification in the second method according to the exemplary embodiment.

For the maintenance of the "RIP currently using entry" column, upon arrival of a use start request for cache data from any of the RIP units 120, as illustrated by way of example in FIG. 21, the cache management unit 130 registers the cache data (S80), and increases the value of the use counter by 1 (S82). The cache management unit 130 also adds the identification information regarding the requesting RIP unit 120 to the "RIP currently using entry" column for the cache entry (S83). Further, upon arrival of a use end notification about cache data from any of the RIP units 120, as illustrated by way of example in FIG. 22, the cache management unit 130 decreases the value of the use counter by 1 (S85), and also deletes the identification information regarding the RIP unit 120 that has sent the notification from the "RIP currently using entry" column for the cache entry (S87).

In the second method according to the second exemplary embodiment, furthermore, upon receipt of an area reservation request from any of the RIP units 120, the cache management unit 130 performs substantially the same operation as that in the procedure in the first exemplary embodiment illustrated in FIG. 10. In the procedure, if it is determined in S106 that a subordinate entry is found, in the second method, the cache management unit 130 executes a procedure illustrated in FIG. 23. The procedure illustrated in FIG. 23 may be similar to the procedure (FIG. 19) in the first method described above, except for the processing of S127, S128A, and S132A.

Figure 23:
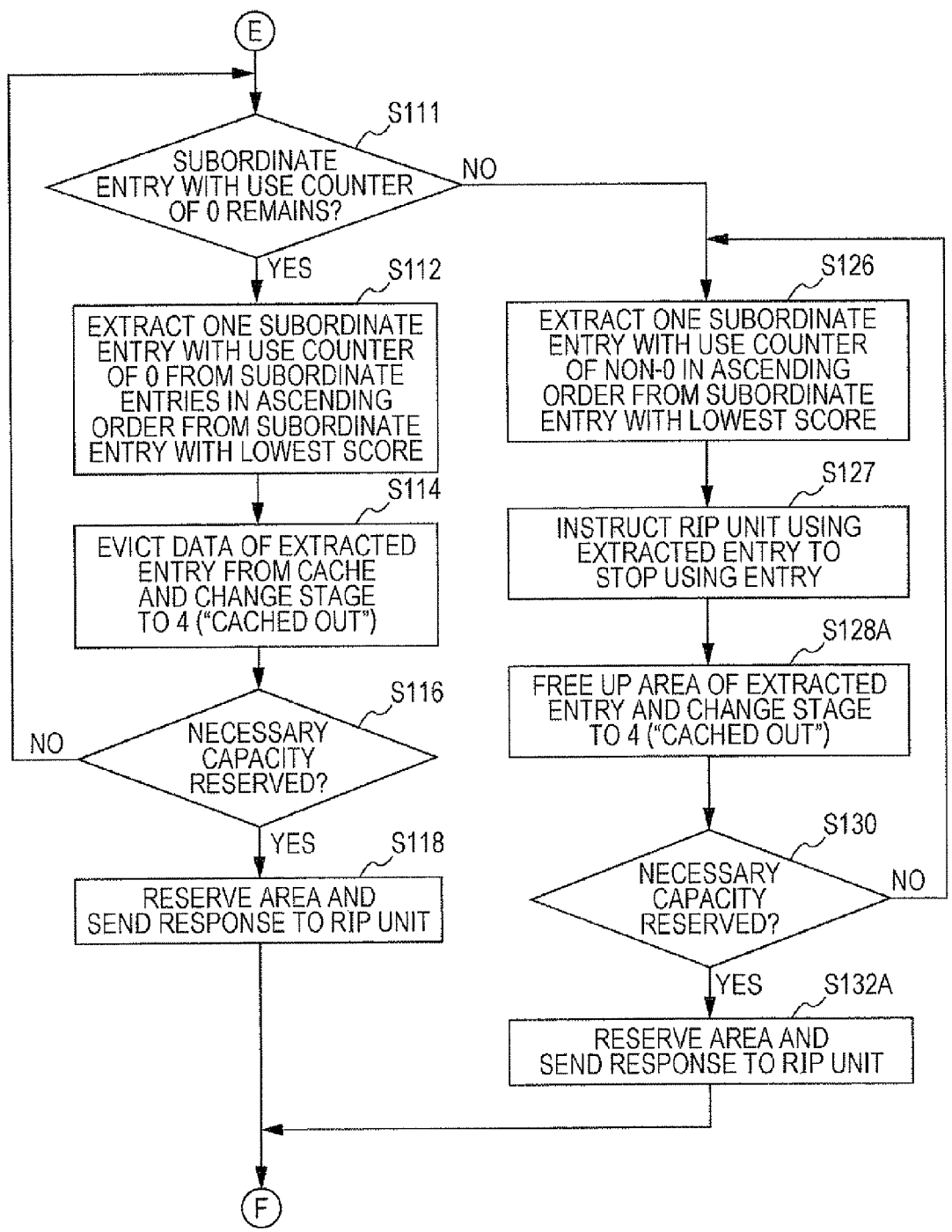
FIG. 23 is a flowchart illustrating the substantial part of a second method in an example of a processing procedure of the cache management unit upon receipt of an area reservation request from a RIP unit according to the exemplary embodiment.

That is, the procedure illustrated in FIG. 23 is substantially the same as the procedure (FIG. 19) in the first method described above in that after it is determined in S111 that any subordinate entry at stage 3, i.e., "Cached", and with a use counter of 0 does not remain, the processing of S122 and S124 (the target entry is made to transition to stage 2, i.e., "Caching", and a response indicating the failure of reservation is returned) is not performed. The procedure illustrated in FIG. 23 is different from the procedure illustrated in FIG. 19 in that after S126, in S127, each RIP units 120 registered in the "RIP currently using entry" column for the extracted cache entry is instructed to stop using the cache data of the entry (and to perform RIP processing again from the original PDL data), and in S128A, the stage of the entry is changed to 4. In addition, the cache data of the entry is actually deleted from the cache memory 140, and the area for the data is freed up.

In the second method, the cache data has actually been deleted and the area therefor has been freed up and is available. Thus, in S132A in the procedure illustrated in FIG. 23, the cache area for the target entry may be reserved from the available area. Therefore, no need exists to reserve a cache area beyond the area allocated to the cache memory 140 by the operating system. In the second method, the cache area necessary for the target entry is immediately reserved. Since a subordinate entry that is at stage 1 and for which a cache area has been forced to be freed up has a lower score than the target entry, it may be better in terms of cache use efficiency to free up an area for the cache data of a subordinate entry currently being used than to abandon the caching of the cache data of the target entry.

Third Method: Eviction after Completion of Use

Figure 24:
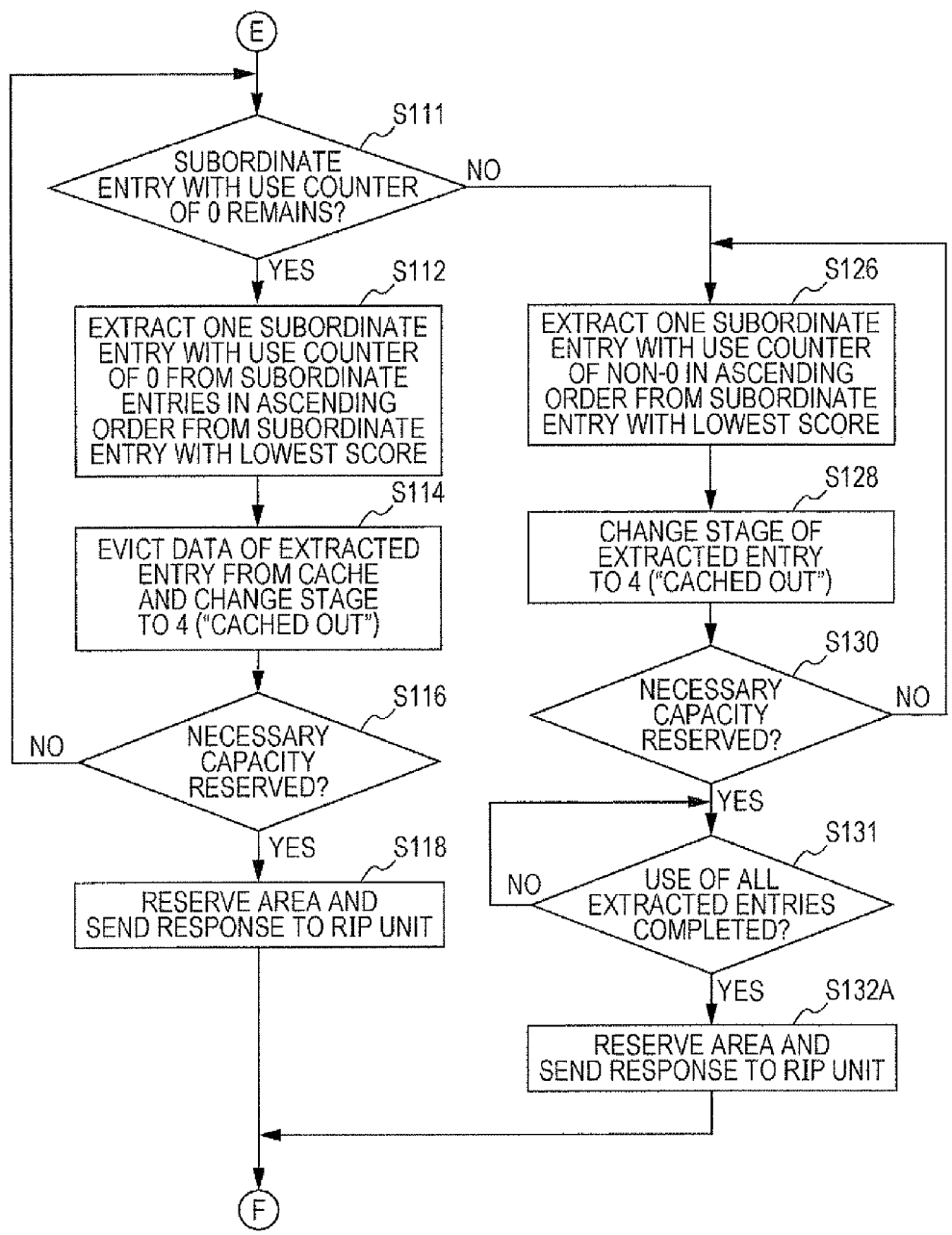
FIG. 24 is a flowchart illustrating the substantial part of a third method in an example of a processing procedure of the cache management unit upon receipt of an area reservation request from a RIP unit according to the exemplary embodiment.

In the first method described above, after the end of the use of a subordinate entry made to transition to stage 4, area reservation for the target entry is made (S132) so as to overflow the capacity allocated to the cache memory 140 before the data is deleted. In a third method, in contrast, as illustrated in FIG. 24, the overflow of the cache memory 140 does not occur. That is, the process waits until the use of all the subordinate entries made to transition to stage 4 has been completed (S131). After the freeing up of the areas for all the subordinate entries, area reservation for the target entry is made (S132A). In S131, each subordinate entry whose stage has been changed to 4, i.e., "Cached Out", in the repeated processing of S126 to S130 is stored. For example, the use counters for the individual subordinate entries are periodically monitored, and when the values of the use counters for all the subordinate entries become 0, it is determined that the use of all the subordinate entries has been completed.

In the procedure illustrated in FIG. 24, in S128, the stage of a subordinate entry is changed from 3, i.e., "Cached", to 4, i.e., "Cached Out". However, unlike S128A in the second method, the cache data is not deleted.

In the third method, a cache area necessary for the target entry is not reserved by the time when the use of the subordinate entries whose stage has been changed to stage 4 is completed, but does not exceed the capacity allocated to the cache memory 140.

Combined Method

The three methods have been described. The cache management unit 130 may execute processing in accordance with one of the three methods or may execute processing while dynamically switching the three methods. An example of the dynamically switching procedure is illustrated by way of example in FIGS. 25 and 26.

Figure 25:
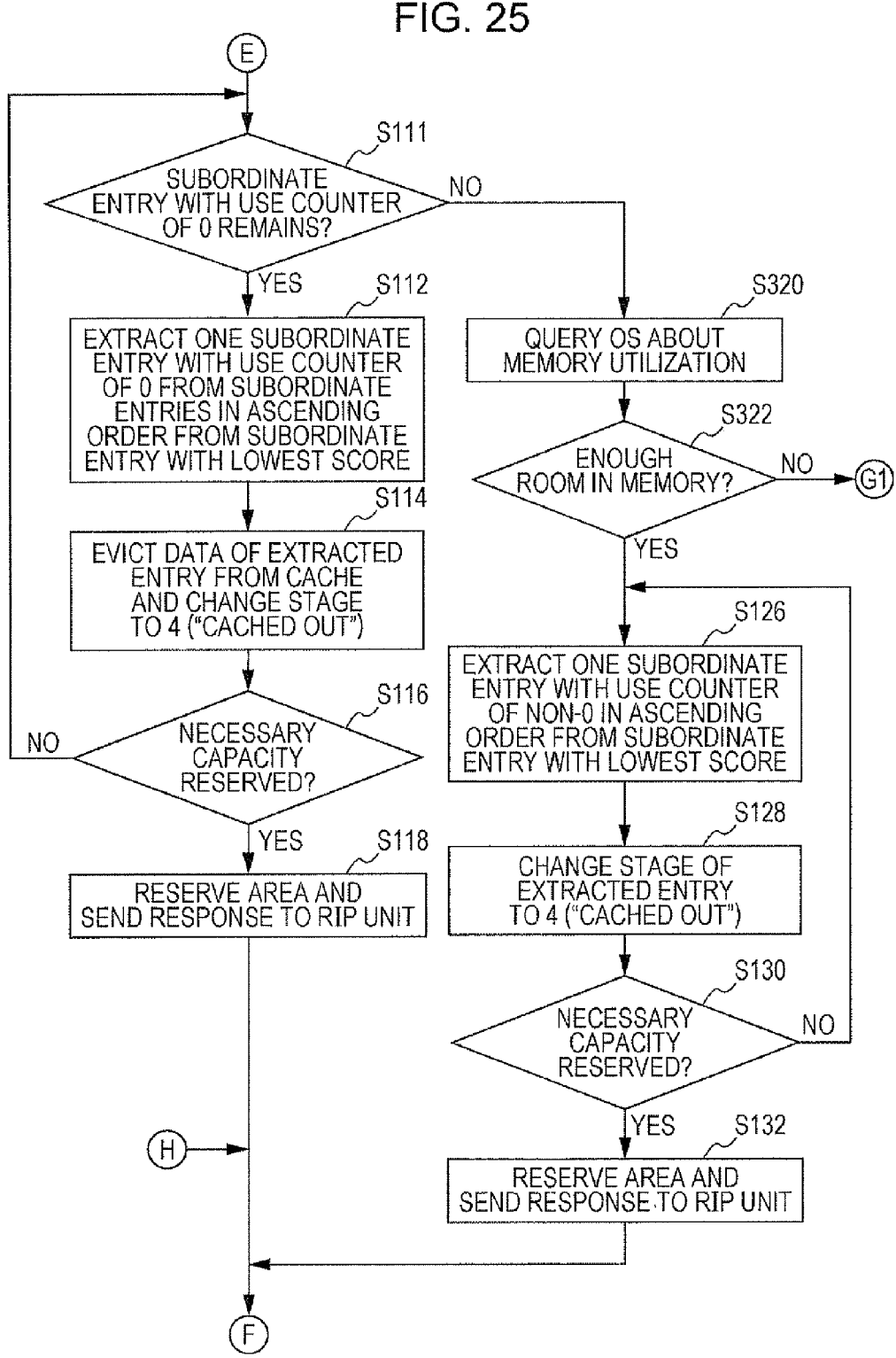
FIG. 25 is a flowchart illustrating a portion of an example of a processing procedure of the cache management unit for dynamically switching the first to third methods according to the exemplary embodiment.

The procedure illustrated in FIG. 25 may be a procedure performed if YES is determined in S106 in the procedure illustrated in FIG. 10. In the procedure illustrated in FIG. 25, S320 and S322 are added to the procedure illustrated in FIG. 19. A description of the steps described above with reference to FIG. 19 is omitted.

In the procedure illustrated in FIG. 19, if NO is determined in S111, that is, if a cache area necessary for the target entry is not reserved even if all the cache data that are not being used are deleted from the cache memory 140, first, the cache management unit 130 queries an operating system (OS) about the available capacity (or utilization or the like) of the memory managed by the OS (S320). The cache management unit 130 is allocated a portion of the memory managed by the OS as the cache memory 140. In S320, the cache management unit 130 queries the OS about the available capacity in the memory in order to determine whether or not it is possible to temporarily increase the area of the cache memory 140 beyond (by overflowing) the allocated memory space. Then, the cache management unit 130 determines, based on the obtained available capacity in the memory, whether or not the memory managed by the OS has room to increase the allocation for the cache memory 140 by the amount corresponding to the cache area for the target entry (S322). In this determination, for example, the size of the cache data of the target entry may be subtracted from the available capacity in the memory managed by the OS, and if the subtraction result exceeds a threshold for the available capacity in the memory for allowing the OS to operate correctly, it may be determined that "the memory has room". If it is determined in S322 that the memory has room, the cache management unit 130 executes a process using the first (overflowing) method illustrated in S126 to S132.

Figure 26:
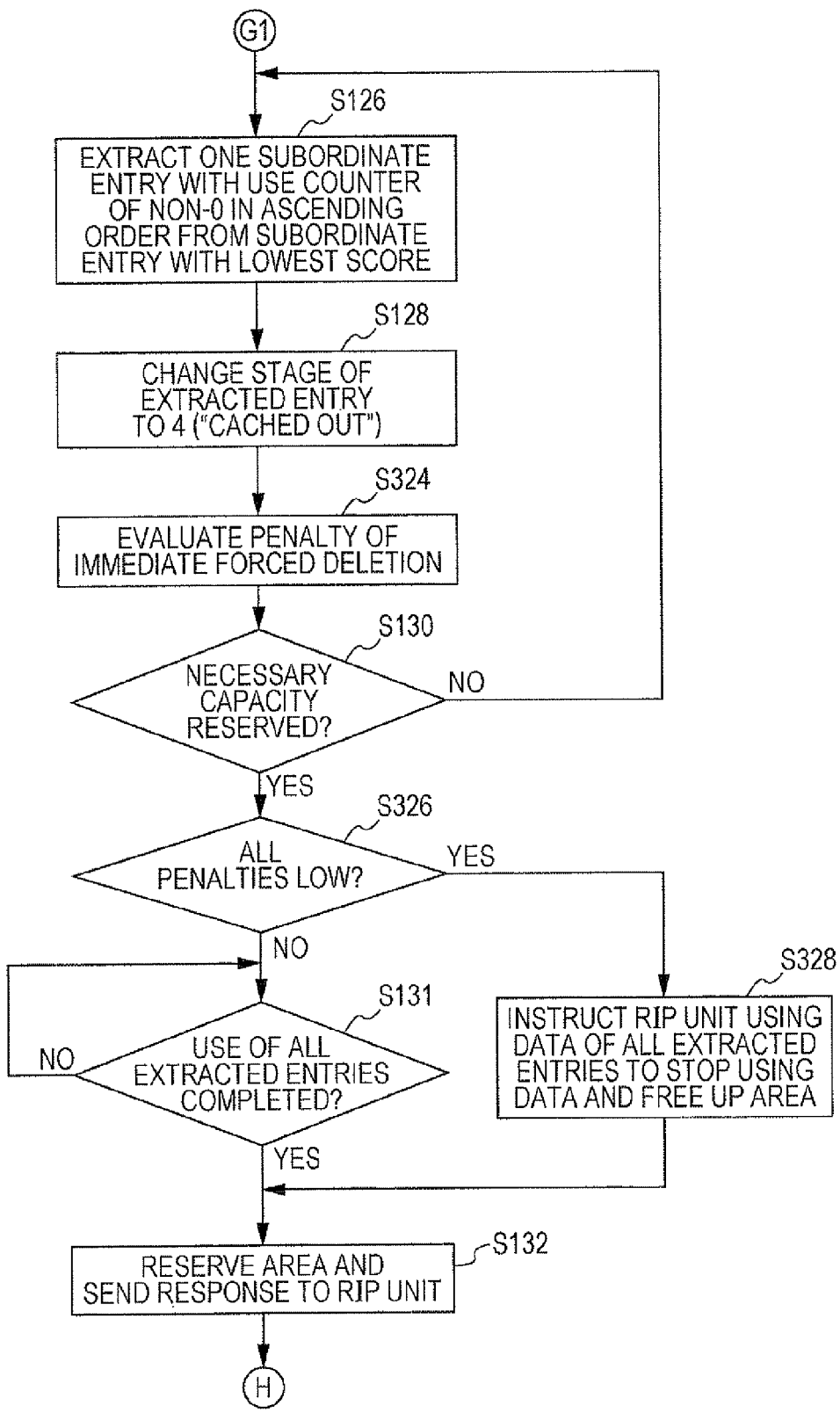
FIG. 26 is a flowchart illustrating the rest of the example of the processing procedure of the cache management unit for dynamically switching the first to third methods according to the exemplary embodiment.

If it is determined in S322 that the memory has no room, the cache management unit 130 selects one of the second (immediate forced eviction) method and the third (eviction after completion of use) method. An example of a procedure therefor is illustrated in FIG. 26. In the procedure illustrated in FIG. 26, the cache management unit 130 extracts one of the subordinate entries (stage 3) having the lowest score (S126). Then, the extracted subordinate entry is made to transition to stage 4, i.e., "Cached Out" (S128), and the available capacity in the cache memory 140 when it is assumed that the cache data of the subordinate entry has been evicted and the cache area therefor has been freed up is computed. The penalty when it is assumed that the cache data of the subordinate entry is immediately forced to be evicted is evaluated (S324). The term "penalty" used here is an evaluation value indicating the amount of damage that each of the RIP units 120 that have used the cache data of the subordinate entry when the cache data of each extracted subordinate entry is immediately evicted suffers.

Various methods may be used for the evaluation of penalties in S324. For example, one available evaluation method is based on the size of the cache data of the subordinate entry to be evaluated. In this method, the larger the size of the cache data is, the higher the penalty for the eviction of the cache data may be. In the immediate-forced-eviction method, cache data currently being used may be evicted, and therefore the RIP unit 120 currently using the cache data may need to perform RIP processing on the PDL data corresponding to the cache data. Generally, the larger the size of the cache data is, the more the time may be required for the RIP processing. Thus, the penalty is increased.

Another method is based on the reading completion ratio that measures the degree to which each RIP unit 120 currently using the cache data of a subordinate entry to be evaluated has been read the cache data (that is, the ratio of a portion that has been read to the entire cache data). In this method, the higher the reading completion ratio of cache data is, the higher the penalty for the immediate eviction of the cache data may be. The eviction may cause the process for reading cache data to be a loss, and the higher the reading completion ratio is, the larger the process loss may be. If multiple RIP units 120 are currently using the cache data of a single subordinate entry, a penalty is determined for each of the RIP units 120. To accomplish this method, for example, the cache management unit 130 periodically records, for each RIP unit 120, a cache entry whose cache data is currently being provided to the RIP unit 120, and the ratio of a provided portion to the entire cache data (that is, the reading completion ratio when viewed from the RIP unit 120).

In still another example, the evaluation is based on the prediction of the time when the use of the cache data of the subordinate entry to be evaluated will be completed (predicted use completion time). If multiple RIP units 120 are currently using the cache data of a single subordinate entry, a predicted use completion time is determined for each of the RIP units 120, and a penalty value is determined from the predicted use completion time. In this method, the closer to the current time the predicted use completion time of cache data is, the higher the penalty for the immediate eviction of the cache data may be. The closer to the current time the predicted use completion time is, the shorter the time may be taken to wait for the completion of the use in order to cache the target entry, and therefore non-immediate eviction may cause less damage (that is, low penalty). To accomplish this method, for example, the cache management unit 130 may periodically record, for each RIP unit 120, a cache entry whose cache data is currently being provided to the RIP unit 120 and the ratio of a provided portion to the entire cache data (that is, the reading completion ratio when viewed from the RIP unit 120), and determine a predicted reading completion time from the changes of the reading completion ratio over time.

Further, it is determined whether or not the available capacity computed in S128 is sufficiently large to accommodate the cache data of the target entry (S130). If the computed available capacity is not sufficient, the process returns to S126. The processing of S126, S128, and S324 is repeated as long as any other subordinate entry having a low score remains. After repeating the processing, when YES is determined in S130, the cache management unit 130 determines whether for all the subordinate entries to be evicted that have been extracted in S126, the values of the penalties computed in S324 are smaller than a predetermined threshold or not (S326). If the penalty for a certain subordinate entry is lower than the threshold, even if the cache data of the subordinate entry is immediately evicted, the disadvantages caused by the eviction (for example, the cost required for the RIP unit 120 currently using the evicted cache data to perform RIP processing on PDL data again) may possibly be less than the advantages offered by the immediate reservation of a cache entry for the target entry. In other words, a threshold that meets the above condition is determined in advance from an experiment or a simulation.

If it is determined in S326 the penalties of all the subordinate entries to be evicted are lower than the threshold, it may be less disadvantageous to immediately evict the cache data of any subordinate entry. In this case, the immediate-forced-eviction method may be used. Specifically, the cache management unit 130 instructs each RIP unit 120 currently using the cache data of a subordinate entry to be evicted to stop using the data. Then, the cache management unit 130 evicts the cache data of the individual subordinate entries, and frees up the cache areas occupied by the cache data (S328). Then, in S132, the cache management unit 130 reserves an area for the target entry in the cache memory 140, and returns a code indicating the reservation of the area and information regarding the address of the reserved area to the requesting RIP unit 120.

If it is determined in S326 that the subordinate entries to be evicted include a subordinate entry with a penalty greater than or equal to the threshold, this means that a subordinate entry that suffers disadvantages if the cache data is immediately evicted is included. In this case, the third (eviction after completion of use) method may be used. Specifically, the cache management unit 130 waits until all the RIP units 120 currently using the cache data of all the subordinate entries to be evicted has completed their use (S131), and reserves an area for the target entry after the areas for all the subordinate entries have been freed up (S132).

In the example described above, the second method and the third method are switched by determining in S326 whether or not all the penalty values are smaller than the threshold. However, this determination standard is merely an example. Any other determination standard may be used such as determining the ratio of subordinate entries whose penalty value is greater than or equal to the threshold and determining that the second (immediate forced eviction) method is used if the ratio is less than or equal to a predetermined threshold ratio.

In the example illustrated in FIGS. 25 and 26, three methods are used in a dynamically switching manner; however, all the three methods may not necessarily be used. Alternatively, two of the three methods may be used in a dynamically switching manner. For example, the first (overflowing) method and the second (immediate forced eviction) method may be dynamically switched. In this case, which method to use may be determined in the processing of S320 and S322 in FIG. 25. When the first method and the third (eviction after completion of use) method are dynamically switched, similar processing may be performed. When the second method and the third method are dynamically switched, which method to use may be determined in the processing of S324 and S326 in FIG. 26.

The print document conversion system 100, or the job management unit 110, the RIP units 120, and the cache management unit 130 included in the print document conversion system 100 may be implemented by, for example, causing a general-purpose computer to execute a program representing the process of the individual functional modules described above. The computer used here has a circuit configuration in which, for example, hardware components such as a microprocessor such as a CPU, a memory (main memory) including a random access memory (RAM) and a read-only memory (ROM), a hard disk drive (HDD) controller that controls an HDD, various input/output (I/O) interfaces, and a network interface that performs control to establish a connection with networks such as various local area networks are connected to one another via, for example, a bus. A disk drive configured to read from and/or write to a portable disk recording medium such as a compact disc (CD) or a digital versatile disc (DVD), a memory reader/writer configured to read from and/or write to a portable non-volatile recording medium of various standards such as a flash memory, and any other suitable device may further be connected to the bus through, for example, an I/O interface. A program describing the content of the process of the individual functional modules described above by way of example is saved in a fixed storage device such as a hard disk drive and installed into a computer via a recording medium such as a CD or a DVD or via a communication medium such as a network. The program stored in the fixed storage device is read to the RAM and is executed by the microprocessor such as the CPU to implement the functional modules described above by way of example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print document processing system comprising a cache apparatus and a plurality of data processing apparatuses,
   each of the plurality of data processing apparatuses including
      an image data creating unit that creates bitmap image data or intermediate language image data by processing page description language data of each document element of print document data, and
      a reservation request transmission unit that transmits a reservation request for reserving a storage area for the image data created by the image data creating unit to the cache apparatus,
   the cache apparatus including
      a cache memory that stores bitmap image data or intermediate language image data created by each of the data processing apparatuses,
      a memory that stores, for each document element whose image data is stored in the cache memory, use condition information and cache priority of the document element, the use condition information being information indicating whether or not the image data of the document element is currently being used by any of the data processing apparatuses, and
      an area reservation unit that upon receipt of a reservation request for reserving a storage area for image data of a first document element from a data processing apparatus among the data processing apparatuses, reserves the storage area by selecting a second document element as a document element to be evicted from the cache memory and evicting the selected second document from the cache memory, the second document element having a lower cache priority than the first document element and currently being used by any of the data processing apparatuses.

2. The print document processing system according to claim 1, wherein each of the data processing apparatuses further includes a unit that transmits a completion notification to the cache apparatus upon completion of a use of image data stored in the cache memory, and
   wherein in accordance with the reservation request, the area reservation unit reserves a storage area for the image data requested in the reservation request, by reserving the storage area beyond a memory space allocated to the cache memory by an operating system that manages the cache apparatus without immediately evicting the image data of the selected second document element from the cache memory, and by evicting the image data of the selected second document element from the cache memory after it is determined that the image data of the selected second document element is not currently being used by any of the data processing apparatuses in accordance with a completion notification from each of the data processing apparatuses.

3. The print document processing system according to claim 1, wherein in accordance with the reservation request, the area reservation unit reserves a storage area for the image data requested in the reservation request, by immediately evicting the image data of the selected second document element from the cache memory, and by instructing a data processing apparatus among the data processing apparatuses that is currently using image data regarding the second document element whose image data has been evicted to stop using the image data of the second document element in the cache memory and to create image data from page description language data of the second document element.

4. The print document processing system according to claim 1, wherein each of the data processing apparatuses further includes a unit that transmits a completion notification to the cache apparatus upon completion of a use of image data stored in the cache memory, and
   wherein in accordance with the reservation request, the area reservation unit reserves a storage area for the image data requested in the reservation request, by evicting image data of all selected second document elements from the cache memory after it is determined that the image data of the selected second document elements is not currently being used by any of the data processing apparatuses in accordance with a completion notification from each of the data processing apparatuses, and by sending a response indicating successful reservation to the data processing apparatus after the image data is evicted.

5. The print document processing system according to claim 1, wherein each of the data processing apparatuses further includes a unit that transmits a completion notification to the cache apparatus upon completion of a use of image data stored in the cache memory,
   wherein the area reservation unit determines, based on an available capacity of a memory managed by an operating system that manages the cache apparatus, whether or not a storage area for the image data requested in the reservation request will be successfully reserved beyond a memory space allocated to the cache memory, and
   wherein the area reservation unit uses a first method if the storage area will be successfully reserved, and uses a second method if the storage area will not be successfully reserved,
   the first method being a method for reserving, in accordance with the reservation request, a storage area for the image data requested in the reservation request, by reserving the storage area beyond the memory space allocated to the cache memory by the operating system that manages the cache apparatus without immediately evicting image data of a selected second document element from the cache memory and by evicting the image data of the selected second document element from the cache memory after it is determined that the image data of the selected second document element is not currently being used by any of the data processing apparatuses in accordance with a completion notification from each of the data processing apparatuses,
   the second method being a method for reserving, in accordance with the reservation request, a storage area for the image data requested in the reservation request, by immediately evicting image data of a selected second document element from the cache memory, and by instructing a data processing apparatus among the data processing apparatuses that is currently using image data regarding the second document element whose image data has been evicted to stop using the image data of the second document element in the cache memory and to create image data from page description language data of the second document element.

6. The print document processing system according to claim 1, wherein each of the data processing apparatuses further includes a unit that transmits a completion notification to the cache apparatus upon completion of a use of image data stored in the cache memory, wherein the area reservation unit determines, based on an available capacity of a memory managed by an operating system that manages the cache apparatus, whether or not a storage area for the image data requested in the reservation request will be successfully reserved beyond a memory space allocated to the cache memory, and wherein the area reservation unit uses a first method if the storage area will be successfully reserved, and uses a second method if the storage area will not be successfully reserved, the first method being a method for reserving, in accordance with the reservation request, a storage area for the image data requested in the reservation request, by reserving the storage area beyond the memory space allocated to the cache memory by the operating system that manages the cache apparatus without immediately evicting image data of a selected second document element from the cache memory and by evicting the image data of the selected second document element from the cache memory after it is determined that the image data of the selected second document element is not currently being used by any of the data processing apparatuses in accordance with a completion notification from each of the data processing apparatuses, the second method being a method for reserving, in accordance with the reservation request, a storage area for the image data requested in the reservation request, by evicting image data of all selected second document elements from the cache memory after it is determined that the image data of the selected second document elements is not currently being used by any of the data processing apparatuses in accordance with a completion notification from each of the data processing apparatuses, and by sending a response indicating successful reservation to the data processing apparatus after the image data is evicted.

7. The print document processing system according to claim 1, wherein each of the data processing apparatuses further includes a unit that transmits a completion notification to the cache apparatus upon completion of a use of image data stored in the cache memory, wherein the area reservation unit computes an evaluation value for evaluating damage of a data processing apparatus among the data processing apparatuses that is using the image data of the selected second document element when the image data of the selected second document element is immediately evicted from the cache memory, and wherein the area reservation unit uses a first method if the evaluation value is less than or equal to a predetermined threshold, and uses a second method if the evaluation value is greater than the predetermined threshold, the first method being a method for reserving, in accordance with the reservation request, a storage area for the image data requested in the reservation request, by immediately evicting image data of a selected second document element from the cache memory, and by instructing a data processing apparatus among the data processing apparatuses that is currently using image data regarding the second document element whose image data has been evicted to stop using the image data of the second document element in the cache memory and to create image data from page description language data of the second document element, the second method being a method for reserving, in accordance with the reservation request, a storage area for the image data requested in the reservation request, by evicting image data of all selected second document elements from the cache memory after it is determined that the image data of the selected second document elements is not currently being used by any of the data processing apparatuses in accordance with a completion notification from each of the data processing apparatuses, and by sending a response indicating successful reservation to the data processing apparatus after the image data is evicted.

8. The print document processing system according to claim 1, wherein each of the data processing apparatuses further includes a unit that transmits a completion notification to the cache apparatus upon completion of a use of image data stored in the cache memory, wherein the area reservation unit determines, based on an available capacity of a memory managed by an operating system that manages the cache apparatus, whether or not a storage area for the image data requested in the reservation request will be successfully reserved beyond a memory space allocated to the cache memory, wherein if the storage area will be successfully reserved, the area reservation unit uses a first method, wherein if the storage area will not be successfully reserved, the area reservation unit computes an evaluation value for evaluating damage of a data processing apparatus among the data processing apparatuses that is using the image data of the selected second document element when the image data of the selected second document element is immediately evicted from the cache memory, and wherein the area reservation unit uses a second method if the evaluation value is less than or equal to a predetermined threshold, and uses a third method if the evaluation value is greater than the predetermined threshold, the first method being a method for reserving, in accordance with the reservation request, a storage area for the image data requested in the reservation request, by reserving the storage area beyond the memory space allocated to the cache memory by the operating system that manages the cache apparatus without immediately evicting image data of a selected second document element from the cache memory, and by evicting the image data of the selected second document element from the cache memory after it is determined that the image data of the selected second document element is not currently being used by any of the data processing apparatuses in accordance with a completion notification from each of the data processing apparatuses, the second method being a method for reserving, in accordance with the reservation request, a storage area for the image data requested in the reservation request, by immediately evicting image data of a selected second document element from the cache memory, and by instructing a data processing apparatus among the data processing apparatuses that is currently using image data regarding the second document element whose image data has been evicted to stop using the image data of the second document element in the cache memory and to create image data from page description language data of the second document element, the third method being a method for reserving, in accordance with the reservation request, a storage area for the image data requested in the reservation request, by evicting image data of all selected second document elements from the cache memory after it is determined that the image data of the selected second document elements is not currently being used by any of the data processing apparatuses in accordance with a completion notification from each of the data processing apparatuses, and by sending a response indicating successful reservation to the data processing apparatus after the image data is evicted.

9. A cache apparatus comprising:

a cache memory that stores bitmap image data or intermediate language image data created by each of data processing apparatuses;

a memory that stores, for each document element whose image data is stored in the cache memory, use condition information and cache priority of the document element, the use condition information being information indicating whether or not the image data of the document element is currently being used by any of the data processing apparatuses; and an area reservation unit that upon receipt of a reservation request for reserving a storage area for image data of a first document element from a data processing apparatus among the data processing apparatuses, reserves the storage area by selecting a second document element as a document element to be evicted from the cache memory and evicting the selected second document from the cache memory, the second document element having a lower cache priority than the first document element and currently being used by any of the data processing apparatuses.

10. A non-transitory computer readable medium storing a program causing a computer to execute a process, the process comprising:

storing, in a cache memory, bitmap image data or intermediate language image data created by each of data processing apparatuses;

storing, in a memory, for each document element whose image data is stored in the cache memory, use condition information and cache priority of the document element, the use condition information being information indicating whether or not the image data of the document element is currently being used by any of the data processing apparatuses; and upon receipt of a reservation request for reserving a storage area for image data of a first document element from a data processing apparatus among the data processing apparatuses, reserving the storage area by selecting a second document element as a document element to be evicted from the cache memory and evicting the selected second document from the cache memory, the second document element having a lower cache priority than the first document element and currently being used by any of the data processing apparatuses.

11. A print document processing method comprising:

creating bitmap image data or intermediate language image data by processing page description language data of each document element of print document data;

transmitting a reservation request for reserving a storage area for the created image data to a cache apparatus;

storing, in a cache memory of the cache apparatus, bitmap image data or intermediate language image data created by each of data processing apparatuses;

storing, in a memory of the cache apparatus, for each document element whose image data is stored in the cache memory, use condition information and cache priority of the document element, the use condition information being information indicating whether or not the image data of the document element is currently being used by any of the data processing apparatuses; and upon receipt of a reservation request for reserving a storage area for image data of a first document element from a data processing apparatus among the data processing apparatuses, reserving the storage area by selecting a second document element as a document element to be evicted from the cache memory and evicting the selected second document from the cache memory, the second document element having a lower cache priority than the first document element and currently being used by any of the data processing apparatuses.

* * * * *